(12) United States Patent
Pieczul

(10) Patent No.: US 12,216,766 B2
(45) Date of Patent: Feb. 4, 2025

(54) TECHNIQUES FOR ASSESSING CONTAINER IMAGES FOR VULNERABILITIES

(71) Applicant: Oracle International Corporation, Redwood Shores, CA (US)

(72) Inventor: Olgierd Stanislaw Pieczul, Dublin (IE)

(73) Assignee: Oracle International Corporation, Redwood Shores, CA (US)

( * ) Notice: Subject to any disclaimer, the term of this patent is extended or adjusted under 35 U.S.C. 154(b) by 274 days.

(21) Appl. No.: 17/592,737

(22) Filed: Feb. 4, 2022

(65) Prior Publication Data

US 2023/0252157 A1 Aug. 10, 2023

(51) Int. Cl.
*G06F 21/57* (2013.01)
*G06F 21/55* (2013.01)

(52) U.S. Cl.
CPC .......... *G06F 21/577* (2013.01); *G06F 21/554* (2013.01)

(58) Field of Classification Search
CPC ...... G06F 21/54; G06F 21/554; G06F 21/566; G06F 21/577; G06F 21/64; G06F 21/44
See application file for complete search history.

(56) References Cited

U.S. PATENT DOCUMENTS

| | | | | |
|---|---|---|---|---|
| 7,188,367 B1 * | 3/2007 | Edwards | ................ | G06F 21/566 713/188 |
| 8,661,126 B2 * | 2/2014 | Cole | ................... | H04L 63/1416 709/224 |
| 10,467,419 B1 * | 11/2019 | Youngberg | ........... | G06F 21/566 |
| 10,719,612 B2 * | 7/2020 | Stopel | ................... | G06F 21/577 |
| 10,754,637 B1 * | 8/2020 | Zeng | .................... | G06F 9/45558 |
| 11,757,907 B1 * | 9/2023 | Berger | ................ | H04L 63/1425 726/23 |
| 2006/0085852 A1 * | 4/2006 | Sima | ..................... | G06F 21/577 726/22 |
| 2012/0304300 A1 * | 11/2012 | LaBumbard | .......... | G06F 21/577 726/25 |

(Continued)

FOREIGN PATENT DOCUMENTS

| | | | | |
|---|---|---|---|---|
| EP | 3355193 A1 * | 8/2018 | ............. | G06F 21/53 |
| KR | 100656351 B1 * | 12/2006 | ......... | H04L 63/1433 |

OTHER PUBLICATIONS

Christopher Thomas Enoch, Calculating Common Vulnerability Scoring System's Environmental Metrics Using Context-Aware Network Graphs, Dec. 15, 2021, Rochester Institute of Technology, MS Thesis, pp. 44-58 (Year: 2021).*

(Continued)

*Primary Examiner* — Chau Le
*Assistant Examiner* — Habibullah
(74) *Attorney, Agent, or Firm* — Kilpatrick Townsend & Stockton LLP

(57) ABSTRACT

Techniques are described for assessing container images for vulnerabilities without actually scanning the container images. A vulnerability assessment system (VAS) is described that is configured to perform vulnerabilities assessment for container images. The VAS is configured to perform the vulnerability assessment without scanning the container images. In certain embodiments, the VAS calculates a vulnerability score for the container image where the vulnerability score is indicative of a probability that the container image contains a vulnerability.

20 Claims, 8 Drawing Sheets

(56) References Cited

U.S. PATENT DOCUMENTS

| | | | | |
|---|---|---|---|---|
| 2016/0294847 | A1* | 10/2016 | Coronado | G06F 16/23 |
| 2017/0098087 | A1* | 4/2017 | Li | H04L 63/1416 |
| 2018/0253558 | A1* | 9/2018 | Li | H04L 63/1433 |
| 2018/0324203 | A1* | 11/2018 | Estes | G06F 9/5061 |
| 2019/0294461 | A1* | 9/2019 | Woods | G06F 16/14 |
| 2020/0082094 | A1* | 3/2020 | Mcallister | G06F 8/77 |
| 2020/0097662 | A1* | 3/2020 | Hufsmith | H04L 9/0643 |
| 2020/0110885 | A1* | 4/2020 | Bellis | G06F 16/9032 |
| 2020/0210590 | A1* | 7/2020 | Doyle | G06F 8/77 |
| 2020/0356806 | A1* | 11/2020 | Li | G06F 18/22 |
| 2021/0096894 | A1* | 4/2021 | Rupprecht | G06F 9/5077 |
| 2021/0173935 | A1* | 6/2021 | Ramasamy | G06F 21/577 |
| 2021/0226978 | A1* | 7/2021 | He | G06F 21/552 |
| 2022/0171856 | A1* | 6/2022 | Bhatt | G06F 21/52 |
| 2022/0318395 | A1* | 10/2022 | Janakiraman | G06F 21/577 |

OTHER PUBLICATIONS

Ehsan Mostajeran et al., "Quantitative Risk Assessment of Container Based Cloud Platform", 2017 IEEE Conference on Application, Information and Network Security (AINS), Published 2017. (Year: 2017).*

Harun Ecik, "Comparison of Active Vulnerability Scanning vs. Passive Vulnerability Detection", 14th International Conference on Information Security and Cryptology, Published: Dec. 2-3, 2021 (Year: 2021).*

"Container Analysis and Vulnerability Scanning", Available Online at: https://cloud.google.com/container-registry/docs/container-analysis, Accessed on Internet on Feb. 3, 2022, pp. 1-3.

"Container Scanning", Available Online at: https://cloud.google.com/container-analysis/docs/container-scanning-overview, Accessed from Internet on Feb. 3, 2022, pp. 1-6.

"Introduction to Microsoft Defender for Container Registries (Deprecated)", Available Online at: https://docs.microsoft.com/en-us/azure/defender-for-cloud/defender-for-container-registries-introduction, Jan. 12, 2022, pp. 1-7.

"Managing Image Security with Vulnerability Advisor", Available Online at: https://cloud.ibm.com/docs/va?topic=va-va_index&interface=ui, Accessed from Internet on Feb. 3, 2022, pp. 1-8.

"Open Source Container Security with Syft & Grype", Anchore, Available Online at: https://anchore.com/opensource/, Accessed from Internet on Feb. 3, 2022, 12 pages.

"Overview of Microsoft Defender for Containers", Available Online at: https://docs.microsoft.com/en-us/azure/defender-for-cloud/defender-for-containers-introduction?tabs=defender-for-container-arch-aks, Jan. 24, 2022, pp. 1-11.

"The Fundamentals of Container Security", Anchore.com, 2020, 18 pages.

"What is Clair?", Available Online at: https://www.redhat.com/en/topics/containers/what-is-clair, Jan. 8, 2019, pp. 1-7.

Hausenblas et al., "Native Container Image Scanning in Amazon ECR", Available Online at: https://aws.amazon.com/blogs/containers/amazon-ecr-native-container-image-scanning/, Oct. 28, 2019, pp. 1-7.

* cited by examiner

TECHNIQUES FOR ASSESSING CONTAINER IMAGES FOR VULNERABILITIES

TECHNICAL FIELD

This disclosure generally relates to detection of vulnerabilities in containers. More specifically, but not by way of limitation, this disclosure describes techniques for assessing container images for vulnerabilities without actually scanning the container images.

BACKGROUND

Containerization is quickly becoming a very popular method of managing and deploying software. For example, Linux containers are quickly becoming the de-facto standard of managing and deploying software and are adopted across industry from embedded devices to large-scale cloud systems. While usage of containers provides a number of advantages, it also introduces new challenges. Containers contain container images that are often constructed using multiple layers. For example, a container image for a container may include all the code and dependencies of an application (e.g., a portion of the environment (e.g., operating system), various libraries, utility programs, etc.) in a format that allows the container to run quickly and reliably across computing environments.

As with other software components, containers are monitored and checked for security vulnerabilities. However, checking a computing environment that uses containers is usually a very compute and memory intensive operation. This is because a large number of containers are typically deployed or used in a typical computing environment. Further, with each container containing multiple layers of software components, the number of components and volume of data that have to be processed and scanned for a computing environment can be very large. The amount of data to be scanned in a containerized environment is usually several orders of magnitude larger than in a traditional computing environment that did not use containers.

Tools are available for scanning containers. These tools either scan individual instances of containers to check for vulnerabilities, or scan container images, instead of individual instances of containers, where a container image can be applied to multiple containers. Both these techniques however require an actual scanning of each container instance or of each container image to check for vulnerabilities. While scanning container images instead of individual container instances may reduce the number of scans that are performed, even this reduced number of scans requires a lot of compute and storage resources. Additionally, scanning a container image is technically complicated and time consuming. As a result, scanning multiple container images can take a long time and use a lot of resources. Further, new vulnerabilities may be introduced in a container image after a container image has been scanned and, thus, frequent scanning of container images is desirable and typically performed. This frequent scanning further exacerbates the problem, and in some instances and may not be practically possible in a computing environment including a large number of container images, considering the high computational cost of such scanning methods.

SUMMARY

The present disclosure generally relates to detection of vulnerabilities in containers and container images. More specifically, but not by way of limitation, techniques are described for assessing container images for vulnerabilities without actually scanning the container images. Various inventive embodiments are described herein, including methods, systems, non-transitory computer-readable storage media storing programs, code, or instructions executable by one or more processors, and the like.

Techniques are described for assessing container images for vulnerabilities without actually scanning the container images. A vulnerability assessment system (VAS) is described that is configured to perform vulnerabilities assessment for container images. The VAS is configured to perform the vulnerability assessment without scanning the container images. In certain embodiments, the VAS calculates a vulnerability score for the container image where the vulnerability score is indicative of a probability that the container image contains a vulnerability.

A container image typically comprises multiple layers of software that are hierarchically structured. In certain implementations, for a container image that is to be analyzed for vulnerabilities, the VAS is configured to first identify the various layers in the container image. The VAS computes a vulnerability score for each of the layers in the container image based upon results of scans of container images. The vulnerability score for the container image is then computed based upon the vulnerability scores computed for the software layers within the container image.

In certain embodiments, a VAS determines, based upon metadata associated with a container image, a plurality of layers included in the container image. The VAS calculates a vulnerability score for each layer in the plurality of layers based upon scan results generated from scanning a plurality of container images for vulnerabilities. The VAS computes a vulnerability score for the container image based upon the vulnerability scores calculated for the plurality of layers. The VAS generates a vulnerability report for the container image, the vulnerability report including the vulnerability score for the container image.

In certain embodiments, the plurality of container images does not include the container image for which the vulnerability score is computed.

In certain embodiments, calculating the vulnerability score for each layer in the plurality of layers includes calculating, for a first layer in the plurality of layers, the vulnerability score for the first layer based upon (a) a number of container images in the plurality of container images that include the first layer, and (b) a number of container images in the plurality of container images including the first layer that were found to contain a vulnerability.

In certain embodiments, calculating the vulnerability score for each layer in the plurality of layers includes calculating, for a first layer in the plurality of layers, the vulnerability score for the first layer as a ratio of (a) a number of container images in the plurality of container images that include the first layer, and (b) a number of container images in the plurality of container images including the first layer that were found to contain a vulnerability.

In certain embodiments, the plurality of container images includes the container image for which the vulnerability score is computed.

In certain embodiments, the VAS determines, based upon the vulnerability score computed for the container image, whether an action is to be performed for the container image.

In certain embodiments, determining whether the action is to be performed includes identifying a preconfigured rule and determining whether the action is to be performed based upon the vulnerability score computed for the container image and the identified rule.

In certain embodiments, determining whether the action is to be performed includes determining that the action is to be performed if the vulnerability score computed for the container image is greater than a threshold value.

In certain embodiments, the action includes performing a vulnerability scan on the container image.

In certain embodiments, the action includes generating an ordered list of a set of container images and associated vulnerability scores. The set of container images includes the container image for which the vulnerability score is computed, the set of container images are ordered in the ordered list based upon their associated vulnerability scores, and the container images in the ordered list are scheduled for a vulnerability scan based upon their order in the ordered list starting from the highest ranked container image in the ordered list.

In certain embodiments, the VAS identifies a hierarchy between the layers in the plurality of layers in the container image and computing the vulnerability score for the container image includes generating the vulnerability score for the container image based upon the vulnerability scores calculated for plurality of layers, and for each layer, a weight assigned to the layer based upon a position of the layer in the hierarchy.

In certain embodiments, the VAS identifies a hierarchy between the layers in the plurality of layers in the container image and computing the vulnerability score for the container image includes generating the vulnerability score for the container image based upon the vulnerability scores calculated for plurality of layers, and for each layer, a weight assigned to the layer based upon a memory size of the layer.

In certain embodiments, the VAS identifies a hierarchy between the layers in the plurality of layers in the container image and computing the vulnerability score for the container image includes generating the vulnerability score for the container image based upon the vulnerability scores calculated for plurality of layers, and for each layer, a weight assigned to the layer based upon a most recent scan time of the layer.

In certain embodiments, the VAS identifies a hierarchy between the layers in the plurality of layers in the container image and computing the vulnerability score for the container image includes determining an arithmetic mean of the vulnerability scores calculated for the plurality of layers.

In certain embodiments, computing the vulnerability score for the container image includes identifying, from a plurality of computation techniques, a first computation technique to be used for computing the vulnerability score for the container image and generating the vulnerability score for the container image by using the identified first computation technique.

In certain embodiments, computing the vulnerability score for the container image based upon the vulnerability scores calculated for the plurality of layers includes (a) generating a first vulnerability score for the container image based upon the vulnerability scores calculated for the plurality of layers, (b) determining a time period since a previous vulnerability scan of the container image, (c) generating a second vulnerability score for the container image based upon the first vulnerability score and the time period since the previous vulnerability scan of the container image, where the second vulnerability score is different from the first vulnerability score, and (d) outputting the second vulnerability score as the vulnerability score for the container image.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
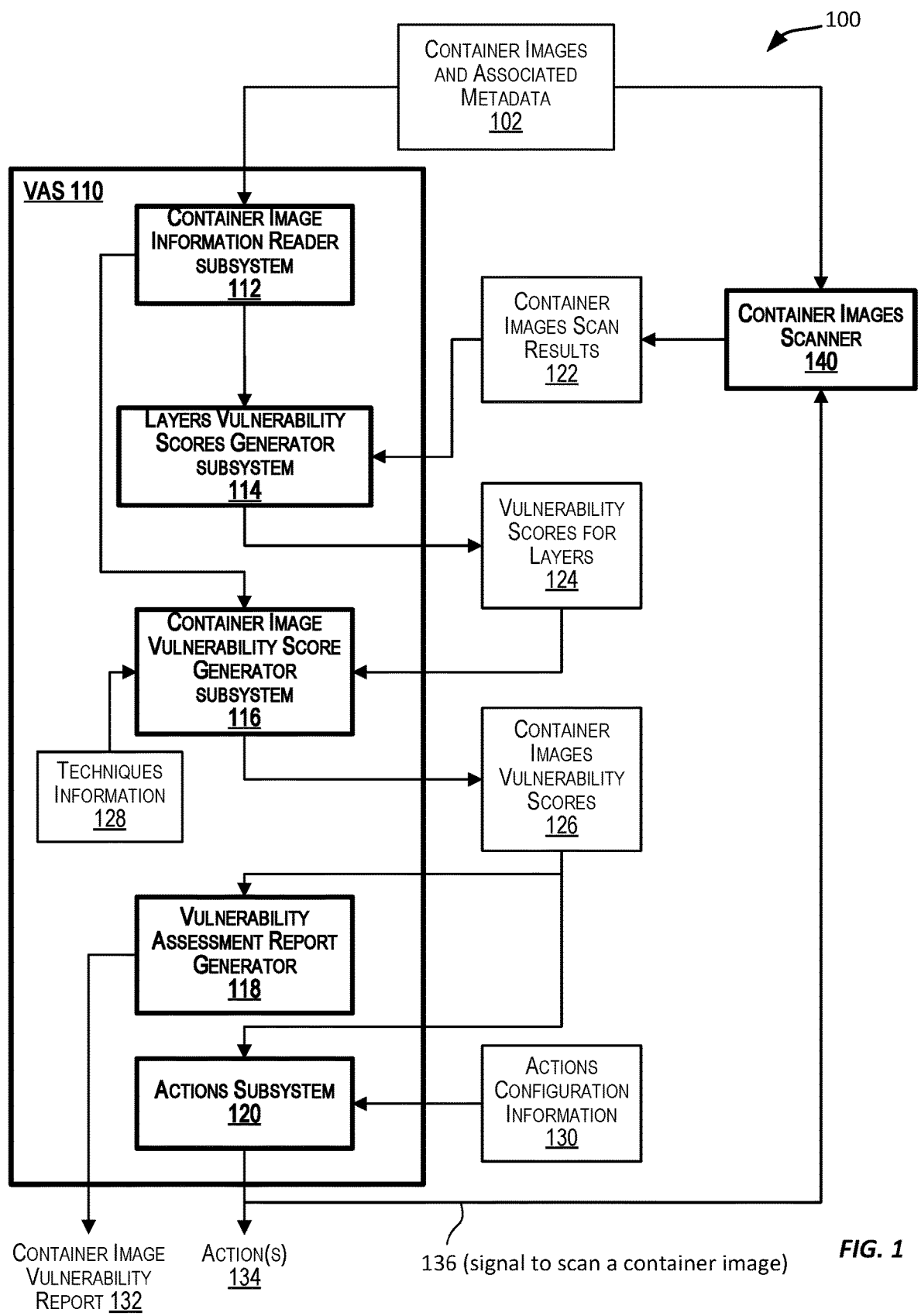
FIG. 1 is a simplified block diagram of a computing environment incorporating a vulnerability assessment system, according to certain embodiments.

In the following description, for the purposes of explanation, specific details are set forth to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure generally relates to detection of vulnerabilities in containers and container images. More specifically, but not by way of limitation, techniques are described for assessing container images for vulnerabilities without actually scanning the container images.

A vulnerability assessment system (VAS) is described that is configured to perform vulnerabilities assessment for container images. Unlike conventional vulnerability assessment techniques that scan the container images for vulnerability, the VAS is configured to perform the vulnerability assessment without scanning the container images. In certain embodiments, the VAS is configured to calculate a vulnerability score for the container image where the vulnerability score is indicative of a probability that the container image contains a vulnerability.

As described herein, a container image typically comprises multiple layers of software that are hierarchically structured. In certain implementations, for a container image that is to be analyzed for vulnerabilities, the VAS is configured to first identify the various layers in the container image. The VAS computes a vulnerability score for each of the layers in the container image based upon results of scans of container images. The vulnerability score for the container image is then computed based upon the vulnerability scores computed for the software layers within the container image.

In certain implementations, the vulnerability score for a software layer of a container image is computed as the ratio of the number of scanned container images containing that layer that were found to be contain a vulnerability to the total number of container images containing that layer that were scanned. Accordingly, based upon the results of scans of container images, where the scan result for a container image indicates whether the container image contains a vulnerability or not, the VAS may use this ratio to compute vulnerability scores for individual layers included in scanned container images. Per the teachings described herein, a vulnerability score for a container image is determined based upon the vulnerability scores computed for the layers of the container image. The vulnerability score computed for the container image is indicative of a probability that the container image contains a vulnerability. Various different computation techniques, such as average mean techniques, weighted mean technique, and other may be used by the VAS for computing the vulnerability score for a container image.

According to the techniques described herein, a vulnerability score for a container image is computed without having to scan that container image. The processing performed by the VAS for computing the vulnerability score for a container image takes far less compute and memory resources than those needed for scanning the container image. Accordingly, the VAS saves significant memory and compute resources by being able to perform vulnerability assessment for a container image without having to scan the container image. These compute and memory resources are then available for performing other important functions in the computing environment. Additionally, computing a vulnerability score for a container image is much faster than scanning the container image. Thus, the identification of container images with or without possible vulnerabilities can be performed in a much faster time than the scanning of the container images. Further, these benefits are all achieved without compromising the security of the computing environment.

The techniques described herein are especially beneficial in computing environments that make heavy use of containers. Typically, in such an environment, the number of scans that are performed is quite large due to the large number of containers. The techniques described herein can perform the vulnerability assessment without having to perform scans. This reduces the number of scans that need to be performed in such a computing environment and this translates to significant savings in compute and memory resources.

One or more actions may be performed based upon the vulnerability score computed for a container image. For example, in one scenario, if the vulnerability score computed for a container image is higher than a predefined threshold value, thereby indicating that the container image has a higher probability of containing a vulnerability, one or more actions may be triggered with respect to the container image. For example, the container image may be marked for actual scanning. The scanning may not be performed for a container image with a vulnerability score that is lower than the threshold, thereby indicating that the container image has a lower probability of containing a vulnerability. In this manner, instead of blindly scanning all container images, as done in the past, whether or not a container image should be scanned is determined intelligently based upon the vulnerability score computed for the container image and a predefined threshold. This helps reduce the overall number of container image scans that are performed, which in turn, saves significant compute and memory resources, since the memory and compute resources needed to perform an actual scan are far greater than resources used for performing the processing described herein.

As another example, the vulnerability scores computed for container images may be used to change the prioritization of scans of container images. The VAS may generate an ordered list of container images wherein the container images are ordered in descending or decreasing order based upon their associated vulnerability scores, such that a container image with a higher vulnerability score is ranked higher in the list than a container image with a lower vulnerability score. This ordered list may then be used to schedule actual scans of the container images starting with the top of the list. In this manner container images with higher probabilities of containing a vulnerability, as indicated by their higher associated vulnerability scores, are scheduled for scanning before container images with lower probabilities of containing a vulnerability as indicated by their lower associated vulnerability scores. This is especially useful in environments where the availability of compute and memory resources is limited or is expensive. The valuable resources are used for scanning container images that have a higher probability of containing vulnerabilities than scanning container images with lower probabilities of containing vulnerabilities. In certain implementations, the VAS generates an ordered list of a set of container images and associated vulnerability scores including the container image for which a vulnerability score is computed. The set of container images can be ordered in the ordered list based upon their associated vulnerability scores and the VAS can schedule, for a vulnerability scan, the container images in the ordered based upon their order in the ordered list starting from the highest ranked container image in the ordered list to the lowest ranked container image in the ordered list.

In certain implementations, the VAS generates a vulnerability report for a container image for which the VAS performs vulnerability assessment. The vulnerability report may include information identifying the vulnerability score. The report may also identify the layers of the container image and the vulnerability scores for the layers. This allows a user consuming the report to potentially identify a reason for a high vulnerability score for the container image. If one or more actions are triggered in response to the vulnerability score for the container image, the vulnerability report may also identify those actions.

FIG. 1 is a simplified block diagram of a computing environment 100 incorporating a vulnerability assessment system (VAS) 110 according to certain embodiments. In addition to VAS 110, computing environment 100 also comprises a container images scanner system 140. Each of the systems depicted in FIG. 1 may comprise one or more subsystems. For example, in FIG. 1, VAS 110 comprises a container image information reader subsystem 112, a layers vulnerability scores generator subsystem 114, a container image vulnerability score generators subsystem 116, a vulnerability assessment report generator 118, and an actions subsystem 120. The various systems and subsystem depicted in FIG. 1 may be implemented in software (e.g., code, computer readable instructions) that may be executed by one or more processors, in hardware, or combinations thereof. Computing environment 100 depicted in FIG. 1 is merely an example and is not intended to unduly limit the scope of claimed embodiments. One of ordinary skill in the art would recognize many possible variations, alternatives, and modifications. For example, in some implementations, environment 100 may have more or fewer systems or subsystems than those shown in FIG. 1, may combine two or more systems or subsystems, or may have a different configuration or arrangement of systems and subsystems.

VAS 110 is configured to identify a container image that is to be processed to check for any vulnerabilities. For example, the VAS 110 may receive a request to process the container image. The VAS 110 accesses, using the container image information reader subsystem 112, container images and associated metadata 102 from a memory accessible to the VAS 110 and determine information identifying the container image and metadata associated with the container image. The container image information reader subsystem 112 is configured to identify, based upon the information and metadata, a set of layers (e.g., stacked software layers) that make up the container image and transmit the set of layers to the layers vulnerability scores generator subsystem 114 and to the container image vulnerability generator subsystem 116 for further processing. In addition to receiving the set of layers associated with the container image to be processed, the layers vulnerability scores generator subsystem 114 is configured to receive, from the container image scanner 140, container images scan results 122 of a plurality of container images. The layers vulnerability scores generator subsystem 114 is configured to determine vulnerability scores for layers 124 of the container image based upon the container images scan results 122 of the plurality of container images and based upon the set of layers of the container image to be processed. The layers vulnerability scores generator subsystem 114 is configured to transmit the vulnerability scores for layers 124 to the container image vulnerability score generator subsystem 116. The container image vulnerability scores generator subsystem 116 is configured to determine, in accordance with techniques information 128 (e.g., one or more rules, functions, or other computation techniques), a container image vulnerability score 126 based upon the vulnerability scores for layers 124 of the container image. The container image vulnerability scores generator subsystem 116 can be configured to transmit the determined container image vulnerability score 126 to the actions subsystem 120, which is configured to perform one or more actions 134 in accordance with actions configuration information 130. Actions 134 can include marking the container image for scanning by the container images scanner 140 or otherwise transmitting a signal 136 to the container images scanner 140 to scan the container image to generate container images scan results 122 for the container image. Actions 134 can also include increasing or decreasing a priority of the container image in a list of container images to be scanned in accordance with the determined container image vulnerability score 126. For example, the list of container images to be scanned may ranked based upon a respective container image vulnerability score 126 associated with each container image in the list. The container image vulnerability scores generator subsystem 116 can be configured to transmit the determined container image vulnerability score 126 to the vulnerability assessment report generator 118, which is configured to generate a container image vulnerability report 132 for the container image based upon the container image vulnerability score 126. The container image vulnerability report 132 may indicate the container image vulnerability score 126 as well as any actions 134 taken by the actions subsystem 120 responsive to the container image vulnerability score 126.

Figure 2:
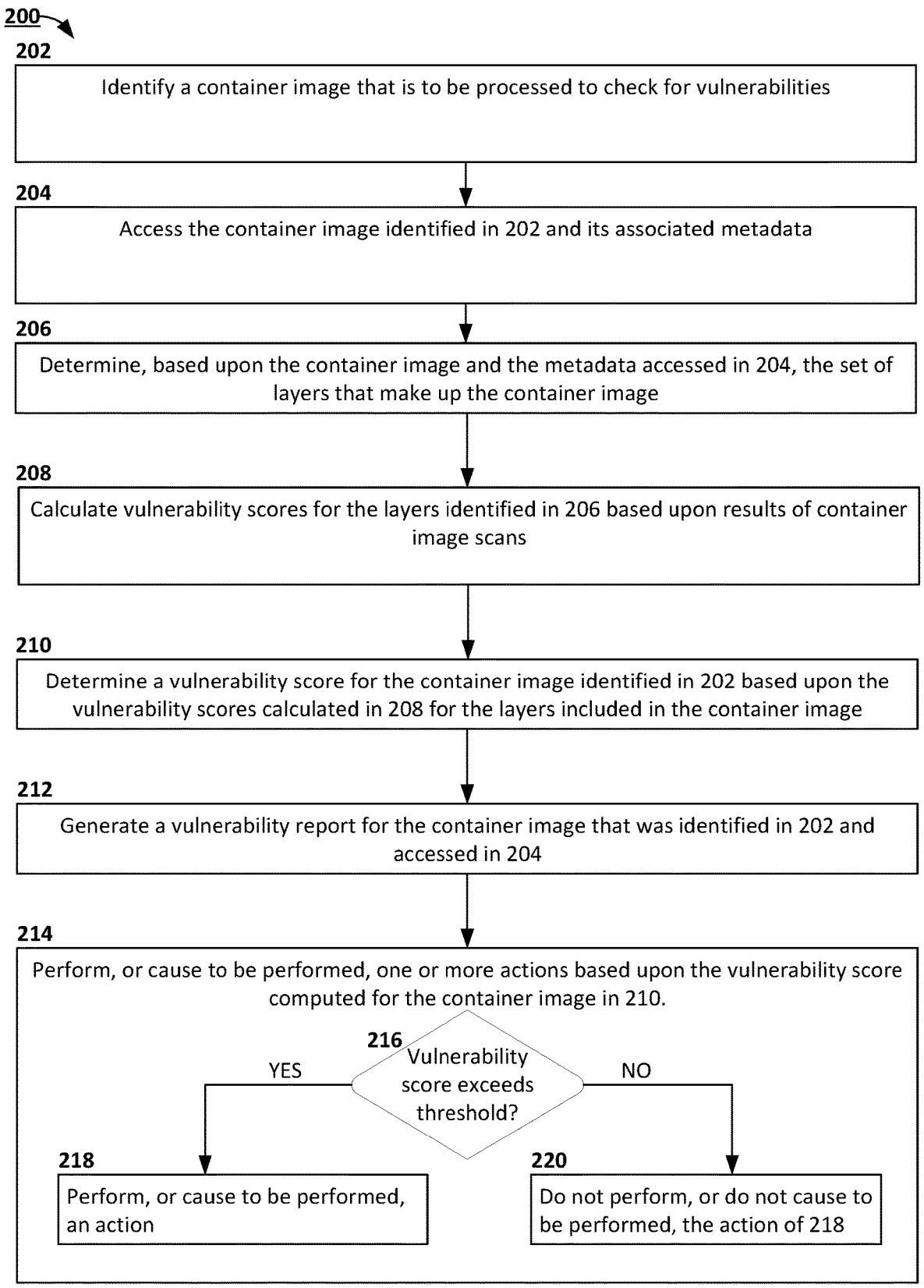
FIG. 2 depicts processing performed by a vulnerability assessment system (VAS), according to certain embodiments.

FIG. 2 depicts a simplified flowchart 200 depicting processing performed by a vulnerability assessment system (VAS) according to certain embodiments. The processing depicted in FIG. 2 may be implemented in software (e.g., code, instructions, program) executed by one or more processing units (e.g., processors, cores) of the respective systems, in hardware, or combinations thereof. The software may be stored on a non-transitory computer-readable storage medium (e.g., on a memory device). The method presented in FIG. 2 and described below is intended to be illustrative and non-limiting. Although FIG. 2 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 1, the processing depicted in FIG. 2 may be performed by VAS 110 and its various subsystems in cooperation with container images scanner 140 depicted in FIG. 1.

As shown in FIG. 2, processing may be triggered, at 202, when VAS 110 identifies a container image that is to be processed to check for any vulnerabilities. In certain instances, VAS 110 may receive information identifying a container image for which a vulnerability check is to be performed. For example, a user of VAS 110 may send a request to VAS 110 identify a container image that is to be checked for vulnerabilities.

The container image identified in 202 may, in some instances, be one that has not been previously scanned for vulnerabilities. In some other instances, the identified container image may be one that has been previously scanned but a reason has arisen for the container image to be reassessed for vulnerabilities. These reasons may include, for example, because time has passed since the previous scan and it time now to reassess the container image, new information has been identified since the previous scan that impacts the vulnerability of the container image, the structure of the container image has been changed due to changes made to a layer of the container image, or a change in the layers in the container image (e.g., addition of a new layer, deletion of an existing layer, etc.), and the like.

In certain implementations, VAS 110 may be configured to periodically and automatically select container images for vulnerability assessment. For example, as shown in FIG. 1, VAS 110 may have access to a set of container images 102, and may periodically select one or more container images from the set for vulnerability assessment. Accordingly, the container image identified in 202 may be one such container image selected by VAS 110 for vulnerability processing.

At 204, VAS 110 accesses the container image identified in 202 and its associated metadata. The container image and its metadata may be accessed by VAS 110 from a memory storing the container image and its metadata. For example, in FIG. 1, VAS 110 may access a container image and its associated metadata from a database or memory store storing multiple container images 102 and associated metadata.

At 206, based upon the container image and the metadata accessed in 204, VAS 110 determines the set of layers that make up the container image. As indicated above, in certain embodiments, container images are built using stacked software layers. The layers may include a base layer followed by one or more subsequent layers. The based layer may, for example, may be a layer that is specific to an operating system. For example, if the container is to execute on a LINUX platform, the base layer may be a LINUX specific layer. For example, the base layer may be a standard image provided by a Linux distribution vendor. One or more software layers may be stacked on top of the base layer. In this manner, a container image may contain a hierarchy of multiple layers stacked on top of each other. A layer in the hierarchy may use one or more lower layers in the hierarchy. For example, a particular container image comprising three layers may include a first (base) layer, a second (intermediate) layer that sits on top of the base layer, and a third (top) layer that sits on top of the second layer. Usage of layers in a container image has several benefits, such as saving space in the container registries, reducing the amount of redundant data that needs to be downloaded to deploy container images. Given a particular container image, multiple instances of containers can be deployed having that particular container image.

Based upon the metadata accessed in 204, at 206, VAS 110 identifies the various layers that make up a container image that is to be processed for vulnerabilities. Based upon the metadata, VAS 110 may also determine the hierarchical relationships between the various layers of the container image. The metadata may also identify additional information about the container image and its layers such as the size (memory storage size) of each layer, time when the scan was performed, and other information. As described below, VAS 110 may use this information for processing the container image for vulnerabilities.

In the embodiment depicted in FIG. 1, container image information reader subsystem 112 of VAS 110 may read information related to a container image and its associated metadata from 102. Based upon the metadata, container image information reader subsystem 112 may identify the software layers that make up the container image and their hierarchical relationships and communicate this information to the layers vulnerability scores generator subsystem 114 and to container image vulnerability score generator subsystem 116 for further processing.

Figure 3:
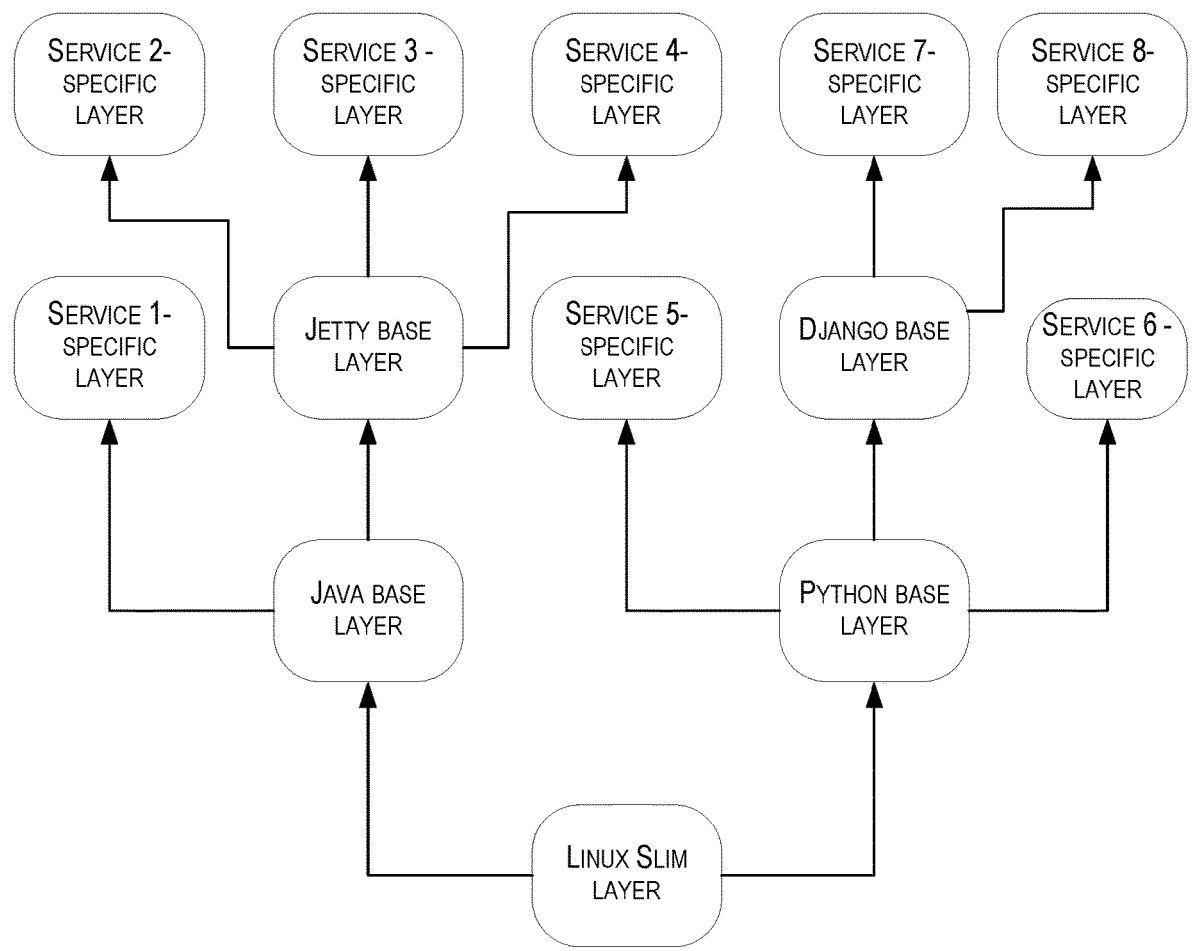
FIG. 3 depicts an example of container images that are built using a hierarchy of software layers used to explain the processing depicted in FIG. 2, according to certain embodiments.

FIG. 3 depicts an example of container images that are built using a hierarchy of software layers. The example depicted in FIG. 3 may be used to explain the processing depicted in FIG. 2. In the embodiment depicted in FIG. 3, eight different container images are shown, namely, container images for Service 1, Service 2, Service 3, Service 4, Service 5, Service 6, Service 7, and Service 8. Each container image may be used to instantiate containers that, when executed by one or more processors, provide a service corresponding to the container image. For example, one or more containers may be instantiated using the container image for Service 1 and each instantiated container may provide Service 1.

In the embodiment depicted in FIG. 3, the layers and the hierarchical relationships between the layers for each container image, starting with the base layer to the top layer, is as follows:

Service 1 container image:
  Linux slim layer→Java base layer→Service 1-specific layer
Service 2 container image:
  Linux slim layer→Java base layer→Jetty base layer-→Service 2-specific layer
Service 3 container image:
  Linux slim layer→Java base layer→Jetty base layer-→Service 3-specific layer
Service 4 container image:
  Linux slim layer→Java base layer→Jetty base layer-→Service 4-specific layer
Service 5 container image:
  Linux slim layer→Python base layer→Service 5-specific layer
Service 6 container image:
  Linux slim layer→Python base layer→Service 6-specific layer
Service 7 container image:
  Linux slim layer→Python base layer→Django base layer→Service 7-specific layer
Service 8 container image:
  Linux slim layer→Python base layer→Django base layer→Service 8-specific layer As seen in FIG. 3, several layers are shared by different container images. For example, the Linux Slim base layer is shared by all the eight container images; the Java base layer is shared by container images for Services 1, 2, 3, and 4; the Jetty base layer is shared by container images for Services 2, 3, and 4; the Python base layer is shared by container images for Services 5, 6, 7, and 8; the Django base layer is shared by container images for Services 7 and 8. If a vulnerability exits in a particular layer, then that vulnerability impacts and exists in all the container images that contain that layer. For example, if a vulnerability is detected in the Django base, that the container images for Services 7 and 8, which contain the Django layer, will be impacted by that vulnerability.

Various different ways may be used to store and represent the various layers and their hierarchical relationships for a container image. In one implementation, the metadata for a container image may store information for a tree or graph, where the nodes of the tree or graph are indicative of the layers and the edges of the tree/graph represent the hierarchical relationships between the layers for that container image. In some other implementation, the metadata for a container image may include table that lists the layers for the container image and their hierarchical relationships. In yet another embodiment, the metadata for the container image may contain information specifying a matrix that identifies the various layers in the container image and their hierarchical relationships.

Referring back to FIG. 3, if Service 7 container image is identified in 202 as the container image to be processed for vulnerabilities, then in 204 VAS 110 may access the metadata for the Service 7 container image. In 206, based upon the metadata accessed in 204, VAS 110 may determine that the Service 7 container image comprises four layers organized in a hierarchy: Linux slim layer→Python base layer-→Django base layer→Service 7-specific layer. As another example, if Service 4 container image is identified in 202 as the container image to be processed for vulnerabilities, then in 204 VAS 110 may access the metadata for the Service 4 container image. In 206, based upon the metadata accessed in 204, VAS 110 may determine that the Service 4 container image comprises four layers organized in a hierarchy: Linux slim layer→Java base layer→Jetty base layer→Service 4-specific layer.

At 208, VAS 110 calculates vulnerability scores for the layers identified in 206 based upon results of container image scans. The results of container image scans are generated from the actual scanning of container images. The scanning may be performed by VAS 110 or some other system. For example, in the embodiment depicted in FIG. 1, container images scanner 140 is configured to scan one or more container images and generate container images scan results 122. These container images scan results 122 are then used by layers vulnerability scores generator subsystem 114 to calculate vulnerability scores for the layers determined in 206 for the container image to be processed. The container images scan results 122 may be stored in a memory location accessible to VAS 110.

In certain embodiments, as part of the processing in 208, VAS 110 accesses and uses all available past vulnerability scan results for container images accessible to VAS 110. In some other embodiments, VAS 110 may access and use past vulnerability scan results within a threshold time window in the past from the time when the vulnerability scores for the layers are to be computed. For example, the time window may be one hour in the past, 12 hours in the past, 1 day in the past, 3 days in the past, or some other predefined threshold time window.

The container images scan results 122 represent results of scans of container images. The scan result generated for a container image as a result of scanning the container image indicated whether the container image contains any vulnerability. Scan results for multiple container images may be included in 122.

Container images scanner 140 may use various different scanning techniques to the scan the container images and generate container images scan results 122. For example, scans may be performed using a scanner that collects vulnerability data from a known set of sources and compares the vulnerability data to software packages identified in the container images. In certain examples, the container images scanner 140 inspects container images layer-by-layer for vulnerabilities specified in the collected vulnerability data and provides a notification of any detected vulnerabilities. Examples of tools that may be used to implement the container images scanner 140 include open source tools provided by Anchor Enterprise such as Syft and Grype. Another example of a scanner that can be used to implement the container images scanner 140 is a Clair scanner, which is an open source project that provides a tool to monitor security of containers. An entire container image is scanned. The results of the scan indicate whether any vulnerabilities are detected from the scan. A scan may detect zero, one, or even multiple vulnerabilities. Only a subset of container images in the computing environment may be scanned.

There are different kinds of vulnerabilities that may be detected as a result of scans of container images. Examples of vulnerabilities may include without restriction various types of security threats identified in the container image, such as missing data encryption, missing authentication/authorization, use of an unsecure or expired certificate, a certificate with a wrong host name, presence of malware, coding flaw, an open socket that may be exploited by malware, incorrect settings or configurations that exposes the container image to hacking or malicious use, software packages with known vulnerabilities, outdated software, etc. In certain implementations, for a vulnerability identified from scanning a container image, the scan results may also indicate a type or category of vulnerability that is detected.

There are various ways in which a vulnerability may be introduced in a container image. A layer within the container image may contain one or more vulnerabilities due to error in the code of the layer. There may be different vulnerabilities in different layers of a container image. One or more vulnerabilities may also be introduced into a container image due to the arrangement of layers in the container image. For example, the inclusion of two specific layers in the same container image may introduce a vulnerability. As another example, a vulnerability may be introduced inside a container image due to two layers interfacing with each other within the container image. A vulnerability may also be introduced due to wrong settings or configuration settings.

Accordingly, as part of the processing in 208, VAS 110 110 (e.g., layers vulnerability score generators subsystem 114 of VAS 110) may access container images scan results 122 for previous scans performed on one or more container images. The scan result for each scanned container image identifies vulnerabilities, if any, detected from the scan. VAS 110 may access multiple such scan results in 208.

VAS 110 uses the scan results to compute a vulnerability score for each of the layers in the container image being processed. As discussed above, a container image is structured as a collection of layers. Accordingly, the results of a scan of a container image can be attributed to the layers of that container image. For example, in the example depicted in FIG. 3, if the Service 2 container image was scanned and a vulnerability V1 detected in the scan, the scan result indicates that vulnerability V1 was detected in the scan of the Service 2 container image. This vulnerability V1 can be attributed to the layers of the Service 2 container image, namely to layers Linux Slim, Java base, Jetty base, and Service 2-specific layer. In a similar manner, assuming that the Service 3 container image was scanned, and vulnerability V1 also detected in this scan, the vulnerability can be attributed to layers Linux Slim, Java base, Jetty base, and Service 3-specific layer. In this example, let's further assume that vulnerability V1 is present in the Jetty base layer and thus scans of container images Service 1 and Service 5 did not detect any vulnerabilities. Thus, the scan results may indicate the following:

Service 1—No vulnerability found

Service 2—Vulnerability (V1) found

Service 3—Vulnerability (V1) found

Service 5—No vulnerability found

As part of the processing in 208, VAS 110 may access scan results that comprise results of scans of container images Service 1, Service 2, Service 3, and Service 5 per the above example. Based upon attribution of the results to the individual layers, VAS 110 then computes a vulnerability score for each layer involved in the scans. In certain embodiments, the vulnerability score for each layer ($VS_{layer}$) is computed as a ratio of the number of scanned container images containing that layer that were found to contain a vulnerability to the total number of container images containing that layer that were scanned.

$VS_{layer}$=(number of scanned container images containing that layer that were found to contain a vulnerability)/(total number of scanned container images containing that layer)

In certain embodiments, the vulnerability score computed for a layer according to the above ratio represents a probability that the vulnerabilities found in the scanned container images containing the layer are attributable to that particular layer. For example, if the vulnerability score is 0.5 for a particular layer, the ratio is indicative of a 50% probability that the vulnerabilities detected in the scans of container images containing the particular layer are due to the particular layer.

For the example scan results container images Service 1, Service 2, Service 3, and Service 5, the vulnerability scores for the different layers involved in the scans are computed as shown in Table 1 below.

TABLE 1

Example of vulnerability scores for individual layers based upon scan results for container images for Services 1, 2, 3, and 5 depicted in FIG. 3

| Layer | Total number of scanned container images containing that layer | Number of scanned container images containing that layer that were found to contain a vulnerability | Vulnerability detection ratio (percentage) |
|---|---|---|---|
| Service 1-specific | 1 | 0 | 0 (0%) |
| Service 2-specific | 1 | 1 | 1 (100%) |
| Service 3-specific | 1 | 1 | 1 (100%) |
| Service 5-specific | 1 | 0 | 0 (0%) |
| Jetty base | 2 | 2 | 1 (100%) |
| Java base | 3 | 2 | 0.67 (67%) |
| Python base | 1 | 0 | 0 (0%) |
| Linux Slim | 4 | 2 | 0.5 (50%) |

In Table 1 above, for each individual layer present in the scanned container images:

Column 1: Identifies the layer

Column 2: Identifies the number of scanned container images containing that particular layer.

Column 3: Identifies the total number of scanned container images that contained the particular layer that were found to have a vulnerability.

Column 4: Shows the vulnerability score calculated for that layer based upon a ratio of the numbers in columns 2 and 3.

The explanation of the numbers for the different layers is provided below:

Service 1-Specific Layer:
  Part of one scanned container image: Service 1 container image→value of 1 in col. 2
  Not part of any scanned container image in which a vulnerability was detected→value of 0 (zero) in col. 3
  $VS_{Service\ 1\text{-}specific}=0/1=0$ (in col. 4)

Service 2-Specific Layer:
  Part of one scanned container image: Service 2 container image→value of 1 in col. 2
  Part of one scanned container image in which a vulnerability was detected: Service 2 container image→value of 1 in col. 3
  $VS_{Service\ 2\text{-}specific}=1/1=1$ (in col. 4)

Service 3-Specific Layer:
  Part of one scanned container image: Service 3 container image→value of 1 in col. 2
  Part of one scanned container image in which a vulnerability was detected: Service 3 container image→value of 1 (zero) in col. 3
  $VS_{Service\ 3\text{-}specific}=1/1=0$ (in col. 4)

Service 5-Specific Layer:
  Part of one scanned container image: Service 5 container image→value of 1 in col. 2
  Not part of any scanned container image in which a vulnerability was detected→value of 0 (zero) in col. 3
  $VS_{Service\ 5\text{-}specific}=0/1=0$ (in col. 4)

Jetty Base Layer:
  Part of two scanned container images: Service 2 and Service 3 container images→value of 1 in col. 2
  Part of two scanned container images in which a vulnerability was detected: Service 1 and Service 2 container images→value of 2 in col. 3
  $VS_{Jetty\ base}=2/2=1$ (in col. 4)

Java Base Layer:
  Part of three scanned container images: Service 1, Service 2, and Service 3 container images→value of 3 in col. 2
  Part of two scanned container images in which a vulnerability was detected: Service and Service 2 container images→value of 2 in col. 3
  $VS_{Java\ base}=2/3=0.67$ (in col. 4)

Python Base Layer:
  Part of one scanned container image: Service 5 container image→value of 1 in col. 2
  Not part of any scanned container image in which a vulnerability was detected→value of 0 (zero) in col. 3
  $VS_{Python\ base}=0/1=0$ (in col. 4)

Linux Slim Layer:
  Part of four scanned container images: Service 1, Service 2, Service 3, and Service 5 container images→value of 4 in col. 2
  Part of two scanned container images in which a vulnerability was detected: Service 2 and Service 3 container images→value of 2 (zero) in col. 3
  $VS_{Linux\ Slim}=2/4=0.5$ (in col. 4)

In the manner described above, VAS 110 computes vulnerability scores for the layers involved in the scan results. In certain embodiments, the processing for computation of vulnerability scores for the layers involved in scan results may be performed by VAS 110 in response to a request received in 202 for performing vulnerability analysis for a container image. In one such embodiment, the computation of the layer vulnerability scores may be performed only for those layers that are part of the container image identified in 202.

In other preferred embodiments, the computation of vulnerability scores for layers involved in scan results may be performed by VAS 110 independent of requests to perform vulnerability analysis for individual container images. In such embodiments, vulnerability scores computation for individual layers may be performed by VAS 110 in response to scan results becoming available for analysis by VAS 110. In such embodiments, the scores may be computed for all the layers involved in the scan results. As more scan results become available, vulnerability scores previously computed for individual layers may be updated based upon the newly available scan results and/or new scores may be computed for layers that were previously not involved in any scans. These layer vulnerability scores are then available for use by VAS 110 for computing a vulnerability score for the particular container image identified in 202, as described below.

It is also possible that one or more layers in the container image identified in 202 are not included in any scan results. As a result, the vulnerability score for such a layer is not computed. Accordingly, it is possible, that a layer (or even multiple layers) included in the container image identified in 202 does not have a vulnerability score computed for it.

Referring back to FIG. 2, at 210, VAS 110 determines a vulnerability score for the container image identified in 202 based upon the vulnerability scores calculated in 208 for the layers included in the container image. In the embodiment depicted in FIG. 1, container image vulnerability score generator subsystem 116 may access the vulnerability scores for the various layers 124 generated by layers vulnerability scores generator subsystem 114, and use the scores to generate a vulnerability score 126 for the container image being assessed for vulnerabilities.

VAS 110 may use various different techniques to calculate the vulnerability score for the container image. In certain embodiments, as part of 210, VAS 110 may first identify a particular computation technique to be used and then use the selected technique to compute the vulnerability score for the container image.

In the example embodiment depicted in FIG. 1, the computation of the vulnerability score for a container image is performed by the container image vulnerability score generator subsystem 116. Information regarding the various techniques that are available for computation of the vulnerability score for the container image may be provided in techniques information 128. From the available computation techniques, subsystem 116 may select a particular technique to be used and then apply the selected technique.

In certain embodiments, according to a first technique, the vulnerability score for a container image may be computed by taking an arithmetic mean of the vulnerability scores computed for the individual layers of the container image. For example, if the container image comprises of three layers L1, L2, and L3, then the vulnerability score for the container image is calculated by $(VS_{L1}+VS_{L2}+VS_{L3})/3$. In general, using the arithmetic mean method, for a container image comprising "n" layers and vulnerability scores for the "n" layers are available, then Vulnerability score for the container image=$(VS_{L1}+VS_{L2}+ \ldots +VS_{Ln})/n$.

In certain embodiments, if the vulnerability score for a layer is not available, possibly because the layer was not part of any scanned container image, then that layer is not included in the computation and the denominator "n" is reduced accordingly by the number of layers not participating in the computation.

Using the example from above, let's assume that a vulnerability assessment is to be performed for the Service 4 container image depicted in FIG. 3. In 208, VAS 110 determines that the Service 4 container image contains layers: Linux slim layer→Java base layer→Jetty base layer→Service 4-specific layer. Further assuming scan results and the individual layer vulnerability scores as depicted in Table 1 above, the layer scores for the layers of the Service 4 container image are as follows:

Service 4-specific layer—No score since layer not in a scanned result
Jetty base layer—1 (100%)
Java base layer—0.67 (67%)
Linux Slim layer—0.5 (50%)

Since no layer specific score is available for the Service 4-specific layer, it is not included in the vulnerability score computation for the Service 4 container image ("Service4CI"). Accordingly, the vulnerability score for the Service 4 container image is:

$VS_{Service4CI}=(1+0.67+0.5)/3=0.72$ (or 72%)

In certain embodiments, the vulnerability score computed for a container image indicates a probability that the container image contains a vulnerability. For example, the 0.72 vulnerability score computed for the Service 4 container image indicates that there is a 72% probability or chance that the Service 4 container image contains a vulnerability.

As another example, let's assume that a vulnerability check is to be performed for the Service 6 container image. In this case, in 208, VAS 110 determines that the Service 6 container image contains layers: Linux slim layer→Python base layer→Service 6-specific layer. Further assuming scan results and the individual layer vulnerability scores as depicted in Table 1 above, the layer scores for the layers of the Service 6 container image are as follows:

Service 6-specific layer—No score since layer not in a scanned result
Python base layer—0 (0%)
Linux Slim layer—0.5 (50%)

Since no layer specific score is available for the Service 6-specific layer, it is not included in the vulnerability score computation for the Service 6 container image ("Service6CI"). Accordingly, the vulnerability score for the Service 6 container image is:

$VS_{Service6CI}=(0+0.5)/2=0.25$ (or 25%)

The 0.25 (or 25%) vulnerability score computed for the Service 6 container image indicates that there is a 25% chance or probability that the Service 6 container image contains a vulnerability.

In certain embodiments, a container image that has been previously scanned may still be analyzed according to the processing depicted in FIG. 2 and described. In the example above, the Service 2 container image was scanned and a vulnerability found in the scan results. Certain conditions may cause the Service 2 container image to be again checked for vulnerabilities according to the processing depicted in FIG. 2 without doing an actual scan of the container image. In this case, in 208, VAS 110 determines that the Service 2 container image contains layers: Linux slim layer→Java base layer→Jetty base layer→Service 2-specific layer. Further assuming scan results and the individual layer vulnerability scores as depicted in Table 1 above, the layer scores for the layers of the Service 2 container image are as follows:

Service 2-specific layer—1 (100%)
Jetty base layer—1 (100%)
Java base layer—0.67 (67%)
Linux Slim layer—0.5 (50%)

Accordingly, the vulnerability score for the Service 2 container image is:

$VS_{Service2CI}=(1+1+0.67+0.5)/4=0.79$ (or 79%)

The 0.79 (or 79%) vulnerability score computed for the Service 2 container image indicates that there is a 79% chance or probability that the Service 2 container image contains a vulnerability.

The vulnerability scores computed by VAS 110 may be stored in non-volatile memory and can be consumed by various different downstream consumers. For example, the vulnerability score computed by container image vulnerability score generator subsystem 116 for a container image may be stored in a memory store as part of container image vulnerability scores 126.

At 212, VAS 110 generates a vulnerability report for the container image that was assessed. The vulnerability report generated for a container image comprises information indicative of the results of the vulnerability assessment performed by VAS 110 for the container image. For a particular container image being analyzed, the vulnerability report generated by VAS 110 for the container image may indicate the vulnerability score computed for the container image. The report may also indicate if any actions were initiated or performed responsive to the vulnerability score computation. The report may also include information identifying the various layers that make up the container image and the vulnerability scores computed for the individual layers. The layers information may provide a consumer of the report additional information regarding the possible cause for a high vulnerability score for a container image. The vulnerability report may be provided or communicated to preconfigured recipients, such as to the requester of the analysis (e.g., from whom a request was received in 202 to perform vulnerability analysis for the container image).

In the embodiment depicted in FIG. 1, vulnerability assessment report generator 118 is configured to generate container image vulnerability reports 132. VAS 110 may then communicate these container image vulnerability reports 132 to one or more downstream consumers of the reports.

At 214, one or more actions may be performed based upon the vulnerability score computed for the container image in 210. These actions may be performed by VAS 110 or may be performed by a downstream consumer of the container image vulnerability score. For example, in the embodiment depicted in FIG. 1, one or more actions, if any, may be performed or initiated by actions subsystem 120 of VAS 110.

Various different actions may be performed. In certain embodiments, VAS 110 may be programmed to perform and/or initiate one or more actions by configuring actions configuration information 130 (e.g., action rules). In such an embodiment, upon the computation of a vulnerability score for a container image, VAS 110 may, based upon actions configuration information 130, determine the one or more actions to perform or initiate. Actions subsystem 120 of VAS 110 may then initiate or perform the determined actions. Actions configuration information 130 may be configured by a user of VAS 110. In certain embodiments, different actions may be configured for and performed for different users or customers of VAS 110.

In certain use cases, VAS 110 (or some other downstream consumer of vulnerability scores for container images) may determine whether or not to perform or initiate an action by comparing the vulnerability score computed for a container image in 210 to a preconfigured threshold value. VAS 110 may decide to perform/initiate an action only if the computed vulnerability score for the container image exceeds the threshold value. For example, as shown in FIG. 2, in 216, the vulnerability score computed in 210 for a container image is compared to a preconfigured threshold value. Upon determining in 216 that the vulnerability score is above the threshold, processing proceeds with 218 wherein an action is performed. Upon determining in 216 that the vulnerability score is not above the threshold, processing continues with 220 wherein the action is not performed.

For example, in certain embodiments, the threshold may be set to 75%. From the previous example, the vulnerability scores for the following container images using the arithmetic mean method were computed as follows:

Vulnerability score for Service 2 container image=79%
Vulnerability score for Service 4 container image=72%
Vulnerability score for Service 6 container image=25%

Given these scores and a 75% threshold, the action would only be performed for the Service 2 container image.

In certain embodiments, the actions may include sending messages to one or more recipients informing them of the vulnerability score for the container image. For example, if the vulnerability score for a container image exceeds a threshold, one or more messages may be sent to members of a security team tasked with reducing container image vulnerabilities.

For example, the vulnerability scores computed for container images may be used to determine whether the container images are to be scanned. The threshold may be set such that a vulnerability score computed for a container image that exceeds the predefined threshold indicates a high likelihood that the container image contains a vulnerability, else the vulnerability score indicates a lower likelihood that the container image contains a vulnerability. If the vulnerability score for a container image exceeds the threshold, then that container image is marked for scanning and a scan is performed on the container image to check for vulnerabilities. In this manner, instead of blindly scanning all container images, whether or not a container image should be scanned is determined intelligently based upon the vulnerability score computed for the container image and a predefined threshold. This helps reduce the overall number of container image scans that are performed, which in turn, saves significant compute and memory resources, since the memory and compute resources needed to perform an actual scan are far greater than resources used for performing the processing depicted in FIG. 2, and described above.

As another example, the vulnerability scores computed for container images may be used to change the prioritization of scans of container images. In certain embodiments, an ordered list of container images may be created wherein the container images are ordered in decreasing order based upon their associated vulnerability scores, such that a container image with a higher vulnerability score is ranked higher in the list than a container image with a lower vulnerability score. This ordered list may then be used to schedule actual scans of the container images starting with the top of the list. In this manner container images with higher probabilities of containing a vulnerability, as indicated by their higher associated vulnerability scores, are scheduled for scanning before container images with lower probabilities of containing a vulnerability as indicated by their lower associated vulnerability scores. This is especially useful in environments where the availability of compute and memory resources is limited or is expensive. The valuable resources are used for scanning container images that have a higher probability of containing vulnerabilities than scanning container images with lower probabilities of containing vulnerabilities.

This ordered list may be periodically updated as vulnerability scores for individual layers change, which in turn changes the vulnerability scores for the container images. For example, the vulnerability scores for individual layers may change as new scan results are available for analysis by VAS 110. For example, if the vulnerability score computed for a container image increases, this may change the ranking of the container image in the ordered list and move it closer to the top of the ordered list. Likewise, if the vulnerability score computed for a container image decreases, this may change the ranking of the container image in the ordered list and move it closer to the bottom of the ordered list. In certain implementations, the ordered list may be implemented as a queue in which the ordering of the container images is changed based upon the vulnerability scores computed for the container images.

In certain implementations, a combination of the threshold and prioritization techniques describe above may be used. In one such implementation, a container image may be added to the list only if the vulnerability score computed for the container image exceeds a threshold. For container images that make the list, the list is then ordered in descending order based upon the vulnerability scores of the container images, with higher ranked container images being prioritized for scans over lower ranked container images.

Various different actions may be performed in 214. In the example embodiment depicted in FIG. 1, actions subsystem 120 is configured to determine what actions, if any, to initiate or perform responsive to a vulnerability score computed for a container image. In some embodiments, information and rules regarding what actions to take and under what conditions the actions are to be taken may be configured in actions configuration information 130 that is stored in a memory location accessible to VAS 110. Different actions may be configured for different customers of VAS 110. Based upon the information in 130, actions subsystem 120 of VAS 110 may, given a particular vulnerability score for a container image, determine what action (or actions) to initiate or perform, and then initiate or perform the determined action (or actions). One such action may be to send a signal 136 to container images scanner 140 to scan the container image, possibly because a high vulnerability score was computed for the container image indicative of a high probability that the container image contains a vulnerability.

As discussed above, VAS 110 may use various different techniques and algorithms to compute vulnerability scores for container images. The arithmetic mean technique has been described above. Other techniques may also be used. Some examples of these techniques are described below.

(1) Weighted Mean technique—According to this technique, the vulnerability score for a container image is computed using a weighted mean. In this technique, the hierarchical relationships between the various layers in a container image is considered in the computation of the vulnerability score for the container image. In one example implementation, in the computation of the vulnerability score for a container image, a higher weight is given for higher-level layers of the container image and a lower weight given to lower layers of the container image. The weighted mean representing the vulnerability score may be determined using a formula that uses static weights.

For example, the Service 4 container image comprises four layers with layer vulnerability scores as follows:
Service 4-specific layer—No score since layer not in a scanned result
Jetty base layer—1 (100%)
Java base layer—0.67 (67%)
Linux Slim layer—0.5 (50%)
Using an arithmetic mean technique, the vulnerability score for the Service 4 container image is computed as follows:

$$\text{Arithmetic Mean VS}_{Service4CI} = (1+0.67+0.5)/3 = 0.72 \text{ (or 72\%)}$$

Using a weighed mean technique, weights are assigned such that higher layers are given higher weights that lower layers. In this example, the lowest layer (Linux Slim layer) may be given a weight of "1" with the weight increasing for each successive layer by 1, i.e., "2" for Java base layer, "3" for the Jetty base layer, and "4" for the Service 4-specific layer. However, since there is no vulnerability score available for the Service 4-specific layer, it is not used in the computation. Weighted Mean vulnerability score for Service 4 container image is computed as follows:

$$\text{Weighted Mean } VS_{Service4CI} = ((3*1) + (2*0.67) + (1*0.5))/(3+2+1)$$
$$= 0.81 \text{(or 81\%)}$$

As another example, the Service 6 container image comprises three layers with layer vulnerability scores as follows:
Service 6-specific layer—No score since layer not in a scanned result
Python base layer—0 (0%)
Linux Slim layer—0.5 (50%)
Using an arithmetic mean technique, the vulnerability score for the Service 4 container image is computed as follows:

$$\text{Arithmetic Mean VS}_{Service6CI} = (0+0.5)/2 = 0.25 \text{ (or 25\%)}$$

Using a weighed mean technique, the lowest layer (Linux Slim layer) is assigned a weight of "1", the Python base layer assigned a weight of "2", and the Service 6-specific layer assigned a weight of "3". However, since there is no vulnerability score available for the Service 6-specific layer, it is not used in the computation. Weighted Mean vulnerability score for Service 6 container image is computed as follows:

$$\text{Weighted Mean } VS_{Service6CI} = ((2*0) + (1*0.5))/(2+1) = 0.17 \text{(or 17\%)}$$

As another example, the Service 2 container image comprises four layers with layer vulnerability scores as follows:
Service 2-specific layer—1 (100%)
Jetty base layer—1 (100%)
Java base layer—0.67 (67%)
Linux Slim layer—0.5 (50%)
Using an arithmetic mean technique, the vulnerability score for the Service 2 container image is computed as follows:

$$\text{Arithmetic Mean VS}_{Service2CI} = (1+1+0.67+0.5)/4 = 0.79 \text{ (or 79\%)}$$

Using a weighed mean technique, the lowest layer (Linux Slim layer) is assigned a weight of "1", the Java base layer assigned a weight of "2", the Jetty base layer is assigned a weight of "3", and the Service 2-specific layer assigned a weight of "4". Weighted Mean vulnerability score for Service 2 container image is computed as follows:

$$\text{Weighted Mean } VS_{Service2CI} = ((4*1) + (3*1) + (2*0.67) +$$
$$(1*0.5))/(4+3+2+1)$$
$$= 0.88 \text{(or 88\%)}$$

Various different techniques may be used to assign weights to the different layers. In the example above, static weights were assigned based upon the level of a layer within the container image hierarchy of layers. In the above example, higher weights were given to higher layers. This could be reversed in alternate embodiments with higher weights given to lower layers. The value of the weights may be different in different implementations.

In certain embodiments, the weights assigned to the layers may be dynamically determined based upon one or more attributes of the layers. For example, a weight for a layer may be determined based upon the memory size of the layer, with larger weights assigned for larger layer sizes and smaller weights for smaller layer sizes. A weighted mean technique may then be used to compute a vulnerability score for the container image.

In certain embodiments, the weights for the layers may be assigned based upon layer scan times. For example, a scan time may be associated with a layer, where the scan time indicates the latest time (most previous time) that a container image containing that layer was scanned. For a container image to be processed, layers of the container image are assigned weights based upon the scan times associated with the layers, with layers with more recent scan times given higher weights than layers for less recent scan times. The idea here is that recent scans are given more weight than older scans. A weighted mean technique may then be used to compute a vulnerability score for the container image using the weights and the vulnerability score computed for the individual layers.

(2) Different statistical techniques other than average mean or weighted mean—VAS 110 may use various other statistical computation techniques to compute vulnerability scores for container images that involve the median, a mode, or other statistical function.

(3) Impact of previous container image scans—The previous scan results of a container image may influence the vulnerability score computed for the container image. For example, a first computation technique may be used if the container image has never been scanned previously, and a second different computation technique may be used if the container image has been previously scanned. The computation techniques used may also be different depending upon whether a vulnerability was detected in a previous scan. For example, a computation technique may consider a previous full scan of a container image in calculating a vulnerability score for the container image. For example, a previous full container image scan may be considered as a component of a calculation of an average probability along with other layers of the container image. That is, if a container image has three layers, the vulnerability score could be calculated using four components: the three layers plus the previous full container image scan. Other combinations and computational methods (including other statistical techniques) could be used as well.

In certain embodiments, VAS 110 may also consider the freshness of the previous scan (e.g., how long ago was the scan performed, a time period that has passed since the previous scan). For example, if VAS 110 calculates a vulnerability score for a container image and a previous scan of the container image revealed no vulnerabilities, then VAS 110 may lower the computed vulnerability score based upon the freshness of the previous scan. For example, if a previous scan was conducted within the last ten minutes ago (or some other time window) from the computation of the vulnerability score and detected no vulnerabilities were detected in that scan, VAS 110 may lower the computed vulnerability score by a certain amount "X" (e.g., by 50%, by 25%, or some other value). However, if the previous scan was performed more than 10 minutes ago (or some other time window), then the vulnerability score for the container image may be reduced by an amount "Y", where Y is less than X. In certain implementations, beyond a certain time window, the computed vulnerability score may not be reduced.

If the previous scan detected a vulnerability, then no reduction may be done in certain embodiments. In some other implementations, if the previous scan revealed a vulnerability, the vulnerability score computed by VAS 110 for the container image may even be increased by a certain amount based upon the freshness of the previous scan.

(4) Different computation techniques for different types of scans—For example, a simple arithmetic average could be used for a third-party vulnerability scan but a hybrid computation method could be used for a hardened configuration scan when previous scan results are available. For example, a hardened configuration scan verifies that a hardened configuration (e.g. correct file permissions within the container or other security configuration) of the container image is in accordance with an expected standard.

As described above, a container image can be assessed for vulnerabilities without having to scan that container image. The processing performed by the VAS for computing the vulnerability score for a container image takes far less compute and memory resources than those needed for scanning the container image. Accordingly, the techniques described in this disclosure provide significant memory and compute resources savings by being able to perform vulnerability assessment for a container image without having to scan the container image. These compute and memory resources are then available for performing other important functions in the computing environment. Additionally, computing a vulnerability score for a container image is much faster than scanning the container image. Thus, the identification of container images with or without possible vulnerabilities can be performed in a much faster time than the scanning of the container images. Further, these benefits are all achieved without compromising the security of the computing environment.

This is especially beneficial in computing environments in which a large number of containers with different container image are deployed and used. Typically, in such an environment, the number of scans performed is quite large due to the large number of containers. The techniques described herein can perform the vulnerability assessment without having to perform scans. This reduces the number of scans that need to be performed in such a computing environment and this translates to significant savings in compute and memory resources.

As described above, pre-defined thresholds may be used to conditionally determine is an action is to be performed for a container image based upon the vulnerability score computed for the container image. For example, the container image may be marked for an actual scan if the vulnerability score computed for the container image exceeds a pre-defined threshold, else the scan may not be performed. In this manner, instead of blindly scanning all container images, as done in the past, whether or not a container image should be scanned is determined intelligently based upon the vulnerability score computed for the container image and a predefined threshold. This helps reduce the overall number of container image scans that are performed, which in turn, saves significant compute and memory resources, since the memory and compute resources needed to perform an actual scan are far greater than resources used for performing the processing described herein.

As described above, the vulnerability scores computed for container images may be used to change the prioritization of scans of container images. This is especially useful in environments where the availability of compute and memory resources is limited or is expensive. The valuable resources are used for scanning container images with higher vulnerability score representing a higher probability of containing vulnerabilities than scanning container images with lower vulnerability score representing lower probabilities of containing vulnerabilities.

While the processing depicted in FIG. 2 has been described for analyzing container images, this is not intended to be restrictive. In alternative embodiments, the teachings described in this disclosure may also be used to analyze instances of containers for vulnerabilities. For each container instance to be analyzed, VAS 110 determines the software layers that are in the container. Vulnerability scores are then computed for the container layers based upon scan results, as described above. The vulnerability scores for the layers are then used to compute a vulnerability score for the container instance. One or more actions may then be performed based upon the vulnerability score for the container.

In certain embodiments, the container images vulnerability analysis functionality, without scanning the container images, may be offered as a cloud service by a cloud services provider (CSP) to its subscribing customers. For example, an Infrastructure-as-a-Service provider may offer the service as part of its infrastructure offerings. The following sections describes an IaaS implementation that may offer various cloud services to subscribing customers. The container images vulnerability analysis functionality may be offered as one of the cloud services.

Example Infrastructure as a Service (Iaas) Architecture

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 4:
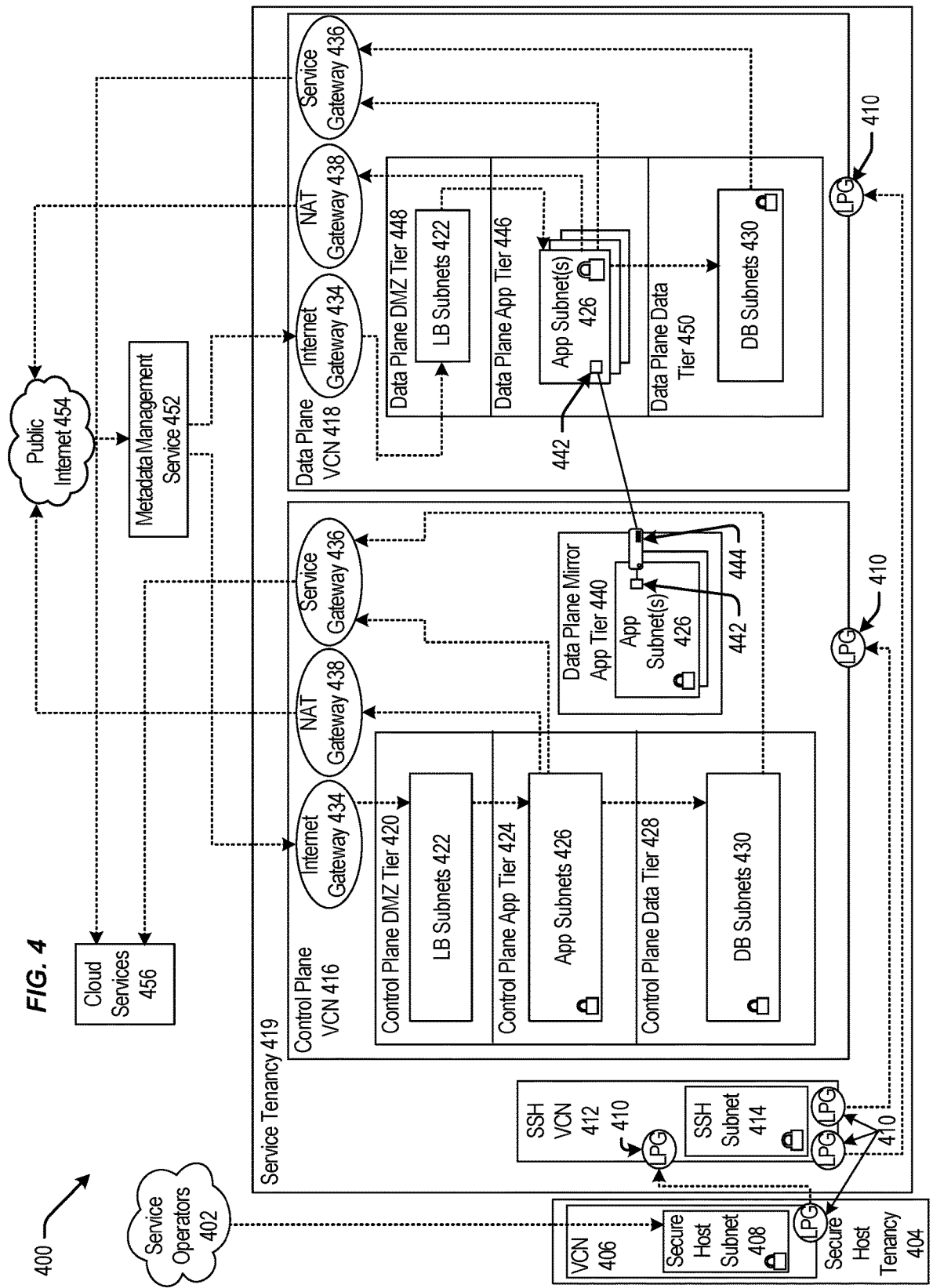
FIG. 4 is a block diagram illustrating one pattern for implementing a cloud infrastructure as a service system, according to at least one embodiment.

FIG. 4 is a block diagram 400 illustrating an example pattern of an IaaS architecture, according to at least one embodiment. Service operators 402 can be communicatively coupled to a secure host tenancy 404 that can include a virtual cloud network (VCN) 406 and a secure host subnet 408. In some examples, the service operators 402 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 406 and/or the Internet.

The VCN 406 can include a local peering gateway (LPG) 410 that can be communicatively coupled to a secure shell (SSH) VCN 412 via an LPG 410 contained in the SSH VCN 412. The SSH VCN 412 can include an SSH subnet 414, and the SSH VCN 412 can be communicatively coupled to a control plane VCN 416 via the LPG 410 contained in the control plane VCN 416. Also, the SSH VCN 412 can be communicatively coupled to a data plane VCN 418 via an LPG 410. The control plane VCN 416 and the data plane VCN 418 can be contained in a service tenancy 419 that can be owned and/or operated by the IaaS provider.

The control plane VCN 416 can include a control plane demilitarized zone (DMZ) tier 420 that acts as a perimeter network (e.g., portions of a corporate network between the corporate intranet and external networks). The DMZ-based servers may have restricted responsibilities and help keep breaches contained. Additionally, the DMZ tier 420 can include one or more load balancer (LB) subnet(s) 422, a control plane app tier 424 that can include app subnet(s) 426, a control plane data tier 428 that can include database (DB) subnet(s) 430 (e.g., frontend DB subnet(s) and/or backend DB subnet(s)). The LB subnet(s) 422 contained in the control plane DMZ tier 420 can be communicatively coupled to the app subnet(s) 426 contained in the control plane app tier 424 and an Internet gateway 434 that can be contained in the control plane VCN 416, and the app subnet(s) 426 can be communicatively coupled to the DB subnet(s) 430 contained in the control plane data tier 428 and a service gateway 436 and a network address translation (NAT) gateway 438. The control plane VCN 416 can include the service gateway 436 and the NAT gateway 438.

The control plane VCN 416 can include a data plane mirror app tier 440 that can include app subnet(s) 426. The app subnet(s) 426 contained in the data plane mirror app tier 440 can include a virtual network interface controller (VNIC) 442 that can execute a compute instance 444. The compute instance 444 can communicatively couple the app subnet(s) 426 of the data plane mirror app tier 440 to app subnet(s) 426 that can be contained in a data plane app tier 446.

The data plane VCN 418 can include the data plane app tier 446, a data plane DMZ tier 448, and a data plane data tier 450. The data plane DMZ tier 448 can include LB subnet(s) 422 that can be communicatively coupled to the app subnet(s) 426 of the data plane app tier 446 and the Internet gateway 434 of the data plane VCN 418. The app subnet(s) 426 can be communicatively coupled to the service gateway 436 of the data plane VCN 418 and the NAT gateway 438 of the data plane VCN 418. The data plane data tier 450 can also include the DB subnet(s) 430 that can be communicatively coupled to the app subnet(s) 426 of the data plane app tier 446.

The Internet gateway 434 of the control plane VCN 416 and of the data plane VCN 418 can be communicatively coupled to a metadata management service 452 that can be communicatively coupled to public Internet 454. Public Internet 454 can be communicatively coupled to the NAT gateway 438 of the control plane VCN 416 and of the data plane VCN 418. The service gateway 436 of the control plane VCN 416 and of the data plane VCN 418 can be communicatively couple to cloud services 456.

In some examples, the service gateway 436 of the control plane VCN 416 or of the data plane VCN 418 can make application programming interface (API) calls to cloud services 456 without going through public Internet 454. The API calls to cloud services 456 from the service gateway 436 can be one-way: the service gateway 436 can make API calls to cloud services 456, and cloud services 456 can send requested data to the service gateway 436. But, cloud services 456 may not initiate API calls to the service gateway 436.

In some examples, the secure host tenancy 404 can be directly connected to the service tenancy 419, which may be otherwise isolated. The secure host subnet 408 can communicate with the SSH subnet 414 through an LPG 410 that may enable two-way communication over an otherwise isolated system. Connecting the secure host subnet 408 to the SSH subnet 414 may give the secure host subnet 408 access to other entities within the service tenancy 419.

The control plane VCN 416 may allow users of the service tenancy 419 to set up or otherwise provision desired resources. Desired resources provisioned in the control plane VCN 416 may be deployed or otherwise used in the data plane VCN 418. In some examples, the control plane VCN 416 can be isolated from the data plane VCN 418, and the data plane mirror app tier 440 of the control plane VCN 416 can communicate with the data plane app tier 446 of the data plane VCN 418 via VNICs 442 that can be contained in the data plane mirror app tier 440 and the data plane app tier 446.

In some examples, users of the system, or customers, can make requests, for example create, read, update, or delete (CRUD) operations, through public Internet 454 that can communicate the requests to the metadata management service 452. The metadata management service 452 can communicate the request to the control plane VCN 416 through the Internet gateway 434. The request can be received by the LB subnet(s) 422 contained in the control plane DMZ tier 420. The LB subnet(s) 422 may determine that the request is valid, and in response to this determination, the LB subnet(s) 422 can transmit the request to app subnet(s) 426 contained in the control plane app tier 424. If the request is validated and requires a call to public Internet 454, the call to public Internet 454 may be transmitted to the NAT gateway 438 that can make the call to public Internet 454. Memory that may be desired to be stored by the request can be stored in the DB subnet(s) 430.

In some examples, the data plane mirror app tier 440 can facilitate direct communication between the control plane VCN 416 and the data plane VCN 418. For example, changes, updates, or other suitable modifications to configuration may be desired to be applied to the resources contained in the data plane VCN 418. Via a VNIC 442, the control plane VCN 416 can directly communicate with, and can thereby execute the changes, updates, or other suitable modifications to configuration to, resources contained in the data plane VCN 418.

In some embodiments, the control plane VCN 416 and the data plane VCN 418 can be contained in the service tenancy 419. In this case, the user, or the customer, of the system may not own or operate either the control plane VCN 416 or the data plane VCN 418. Instead, the IaaS provider may own or operate the control plane VCN 416 and the data plane VCN 418, both of which may be contained in the service tenancy 419. This embodiment can enable isolation of networks that may prevent users or customers from interacting with other users', or other customers', resources. Also, this embodiment may allow users or customers of the system to store databases privately without needing to rely on public Internet 454, which may not have a desired level of threat prevention, for storage.

In other embodiments, the LB subnet(s) 422 contained in the control plane VCN 416 can be configured to receive a signal from the service gateway 436. In this embodiment, the control plane VCN 416 and the data plane VCN 418 may be configured to be called by a customer of the IaaS provider without calling public Internet 454. Customers of the IaaS provider may desire this embodiment since database(s) that the customers use may be controlled by the IaaS provider and may be stored on the service tenancy 419, which may be isolated from public Internet 454.

Figure 5:
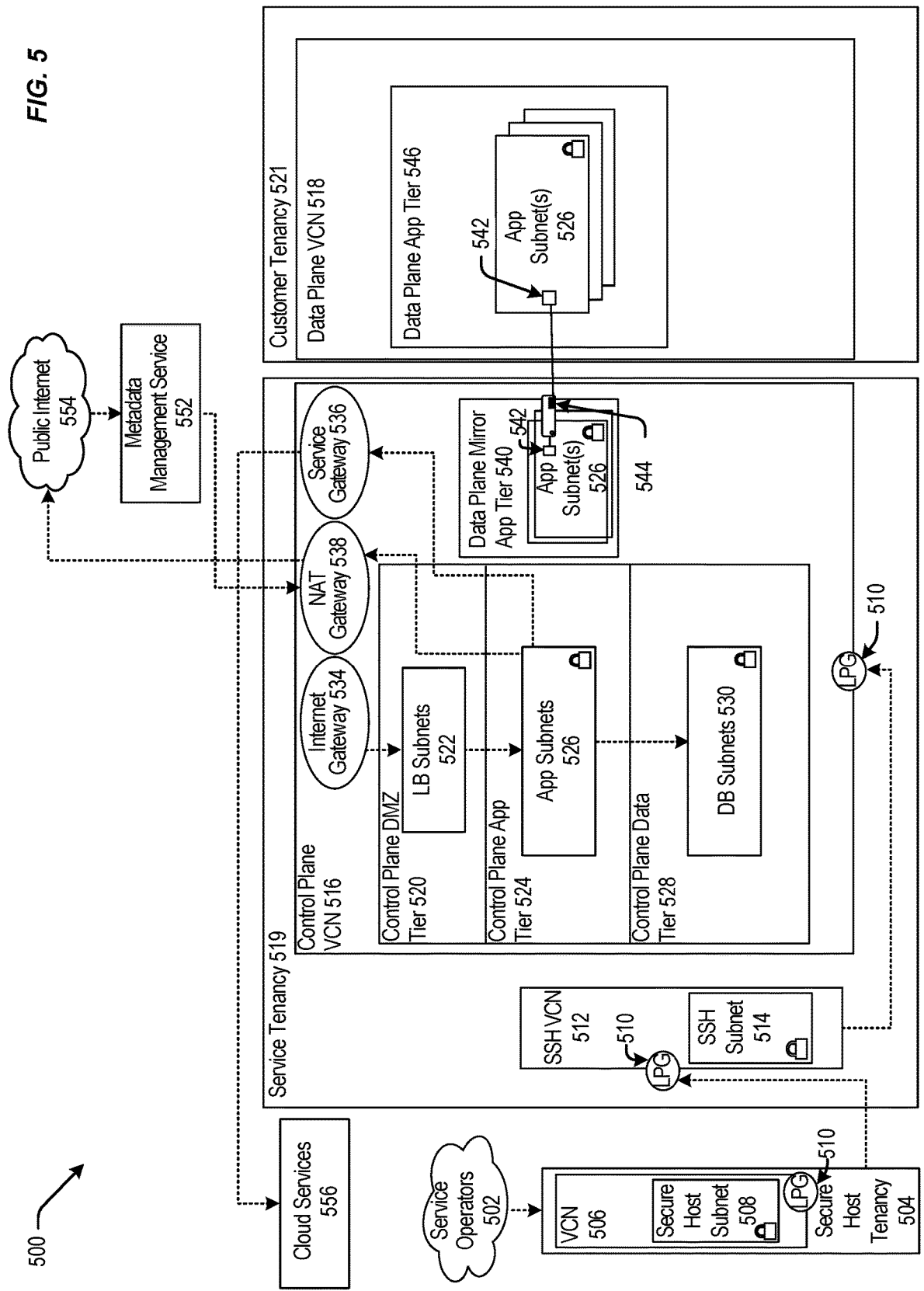
FIG. 5 is a block diagram illustrating another pattern for implementing a cloud infrastructure as a service system, according to at least one embodiment.

FIG. 5 is a block diagram 500 illustrating another example pattern of an IaaS architecture, according to at least one embodiment. Service operators 502 (e.g. service operators 402 of FIG. 4) can be communicatively coupled to a secure host tenancy 504 (e.g. the secure host tenancy 404 of FIG. 4) that can include a virtual cloud network (VCN) 506 (e.g. the VCN 406 of FIG. 4) and a secure host subnet 508 (e.g. the secure host subnet 408 of FIG. 4). The VCN 506 can include a local peering gateway (LPG) 510 (e.g. the LPG 410 of FIG. 4) that can be communicatively coupled to a secure shell (SSH) VCN 512 (e.g. the SSH VCN 412 of FIG. 4) via an LPG 410 contained in the SSH VCN 512. The SSH VCN 512 can include an SSH subnet 514 (e.g. the SSH subnet 414 of FIG. 4), and the SSH VCN 512 can be communicatively coupled to a control plane VCN 516 (e.g. the control plane VCN 416 of FIG. 4) via an LPG 510 contained in the control plane VCN 516. The control plane VCN 516 can be contained in a service tenancy 519 (e.g. the service tenancy 419 of FIG. 4), and the data plane VCN 518 (e.g. the data plane VCN 418 of FIG. 4) can be contained in a customer tenancy 521 that may be owned or operated by users, or customers, of the system.

The control plane VCN 516 can include a control plane DMZ tier 520 (e.g. the control plane DMZ tier 420 of FIG. 4) that can include LB subnet(s) 522 (e.g. LB subnet(s) 422 of FIG. 4), a control plane app tier 524 (e.g. the control plane app tier 424 of FIG. 4) that can include app subnet(s) 526 (e.g. app subnet(s) 426 of FIG. 4), a control plane data tier 528 (e.g. the control plane data tier 428 of FIG. 4) that can include database (DB) subnet(s) 530 (e.g. similar to DB subnet(s) 430 of FIG. 4). The LB subnet(s) 522 contained in the control plane DMZ tier 520 can be communicatively coupled to the app subnet(s) 526 contained in the control plane app tier 524 and an Internet gateway 534 (e.g. the Internet gateway 434 of FIG. 4) that can be contained in the control plane VCN 516, and the app subnet(s) 526 can be communicatively coupled to the DB subnet(s) 530 contained in the control plane data tier 528 and a service gateway 536 (e.g. the service gateway of FIG. 4) and a network address translation (NAT) gateway 538 (e.g. the NAT gateway 438 of FIG. 4). The control plane VCN 516 can include the service gateway 536 and the NAT gateway 538.

The control plane VCN 516 can include a data plane mirror app tier 540 (e.g. the data plane mirror app tier 440 of FIG. 4) that can include app subnet(s) 526. The app subnet(s) 526 contained in the data plane mirror app tier 540 can include a virtual network interface controller (VNIC) 542 (e.g., the VNIC of 442) that can execute a compute instance 544 (e.g. similar to the compute instance 444 of FIG. 4). The compute instance 544 can facilitate communication between the app subnet(s) 526 of the data plane mirror app tier 540 and the app subnet(s) 526 that can be contained in a data plane app tier 546 (e.g., the data plane app tier 446 of FIG. 4) via the VNIC 542 contained in the data plane mirror app tier 540 and the VNIC 542 contained in the data plane app tier 546.

The Internet gateway 534 contained in the control plane VCN 516 can be communicatively coupled to a metadata management service 552 (e.g., the metadata management service 452 of FIG. 4) that can be communicatively coupled to public Internet 554 (e.g., public Internet 454 of FIG. 4). Public Internet 554 can be communicatively coupled to the NAT gateway 538 contained in the control plane VCN 516. The service gateway 536 contained in the control plane VCN 516 can be communicatively couple to cloud services 556 (e.g., cloud services 456 of FIG. 4).

In some examples, the data plane VCN 518 can be contained in the customer tenancy 521. In this case, the IaaS provider may provide the control plane VCN 516 for each customer, and the IaaS provider may, for each customer, set up a unique compute instance 544 that is contained in the service tenancy 519. Each compute instance 544 may allow communication between the control plane VCN 516, contained in the service tenancy 519, and the data plane VCN 518 that is contained in the customer tenancy 521. The compute instance 544 may allow resources, that are provisioned in the control plane VCN 516 that is contained in the service tenancy 519, to be deployed or otherwise used in the data plane VCN 518 that is contained in the customer tenancy 521.

In other examples, the customer of the IaaS provider may have databases that live in the customer tenancy 521. In this example, the control plane VCN 516 can include the data plane mirror app tier 540 that can include app subnet(s) 526. The data plane mirror app tier 540 can reside in the data plane VCN 518, but the data plane mirror app tier 540 may not live in the data plane VCN 518. That is, the data plane mirror app tier 540 may have access to the customer tenancy 521, but the data plane mirror app tier 540 may not exist in the data plane VCN 518 or be owned or operated by the customer of the IaaS provider. The data plane mirror app tier 540 may be configured to make calls to the data plane VCN 518 but may not be configured to make calls to any entity contained in the control plane VCN 516. The customer may desire to deploy or otherwise use resources in the data plane VCN 518 that are provisioned in the control plane VCN 516, and the data plane mirror app tier 540 can facilitate the desired deployment, or other usage of resources, of the customer.

In some embodiments, the customer of the IaaS provider can apply filters to the data plane VCN 518. In this embodiment, the customer can determine what the data plane VCN 518 can access, and the customer may restrict access to public Internet 554 from the data plane VCN 518. The IaaS provider may not be able to apply filters or otherwise control access of the data plane VCN 518 to any outside networks or databases. Applying filters and controls by the customer onto the data plane VCN 518, contained in the customer tenancy 521, can help isolate the data plane VCN 518 from other customers and from public Internet 554.

In some embodiments, cloud services 556 can be called by the service gateway 536 to access services that may not exist on public Internet 554, on the control plane VCN 516, or on the data plane VCN 518. The connection between cloud services 556 and the control plane VCN 516 or the data plane VCN 518 may not be live or continuous. Cloud services 556 may exist on a different network owned or operated by the IaaS provider. Cloud services 556 may be configured to receive calls from the service gateway 536 and may be configured to not receive calls from public Internet 554. Some cloud services 556 may be isolated from other cloud services 556, and the control plane VCN 516 may be isolated from cloud services 556 that may not be in the same region as the control plane VCN 516. For example, the control plane VCN 516 may be located in "Region 1," and cloud service "Deployment 11," may be located in Region 1 and in "Region 2." If a call to Deployment 11 is made by the service gateway 536 contained in the control plane VCN 516 located in Region 1, the call may be transmitted to Deployment 11 in Region 1. In this example, the control plane VCN 516, or Deployment 11 in Region 1, may not be communicatively coupled to, or otherwise in communication with, Deployment 11 in Region 2.

Figure 6:
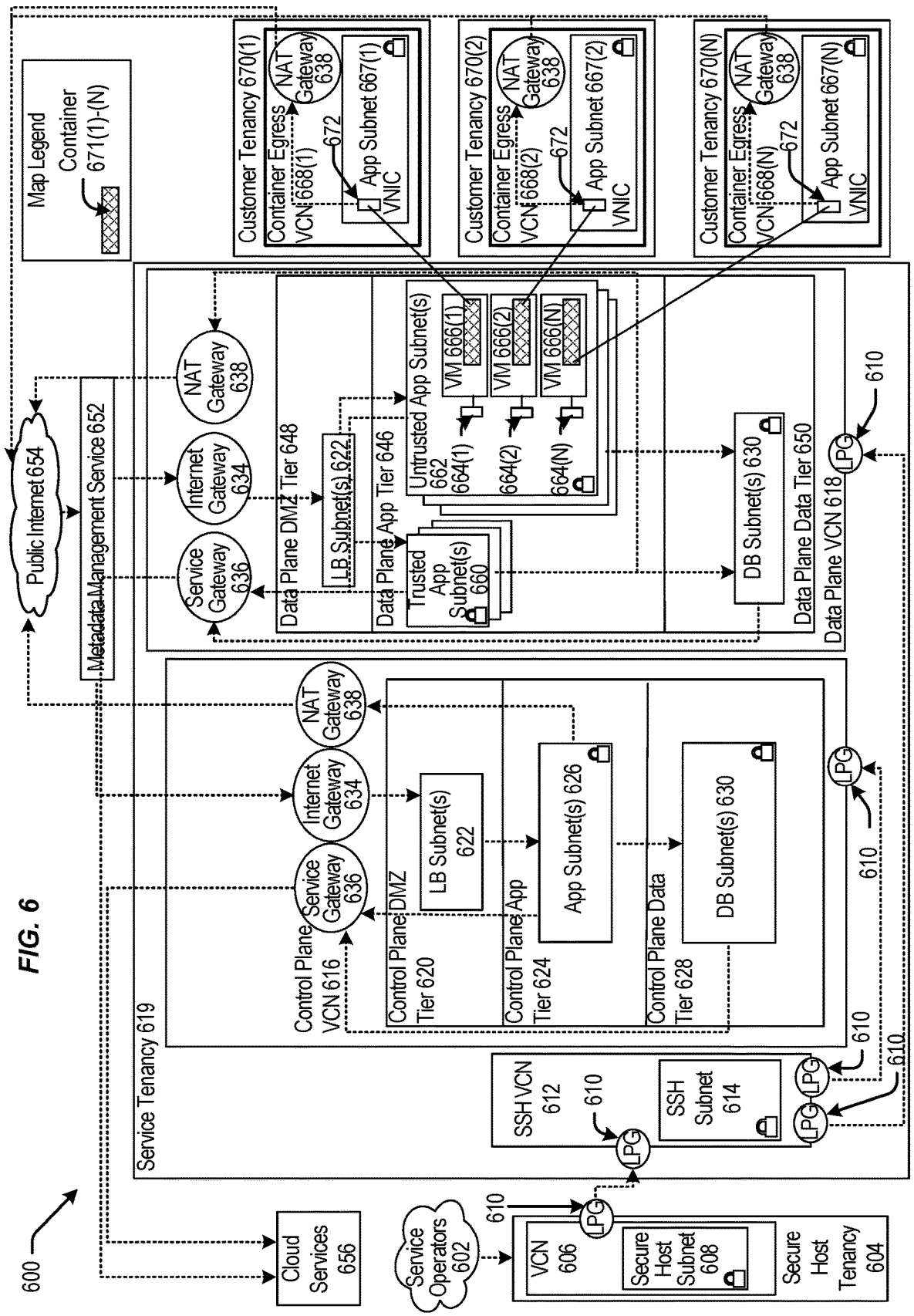
FIG. 6 is a block diagram illustrating another pattern for implementing a cloud infrastructure as a service system, according to at least one embodiment.

FIG. 6 is a block diagram 600 illustrating another example pattern of an IaaS architecture, according to at least one embodiment. Service operators 602 (e.g. service operators 402 of FIG. 4) can be communicatively coupled to a secure host tenancy 604 (e.g. the secure host tenancy 404 of FIG. 4) that can include a virtual cloud network (VCN) 606 (e.g. the VCN 406 of FIG. 4) and a secure host subnet 608 (e.g. the secure host subnet 408 of FIG. 4). The VCN 606 can include an LPG 610 (e.g. the LPG 410 of FIG. 4) that can be communicatively coupled to an SSH VCN 612 (e.g. the SSH VCN 412 of FIG. 4) via an LPG 610 contained in the SSH VCN 612. The SSH VCN 612 can include an SSH subnet 614 (e.g. the SSH subnet 414 of FIG. 4), and the SSH VCN 612 can be communicatively coupled to a control plane VCN 616 (e.g. the control plane VCN 416 of FIG. 4) via an LPG 610 contained in the control plane VCN 616 and to a data plane VCN 618 (e.g. the data plane 418 of FIG. 4) via an LPG 610 contained in the data plane VCN 618. The control plane VCN 616 and the data plane VCN 618 can be contained in a service tenancy 619 (e.g. the service tenancy 419 of FIG. 4).

The control plane VCN 616 can include a control plane DMZ tier 620 (e.g. the control plane DMZ tier 420 of FIG. 4) that can include load balancer (LB) subnet(s) 622 (e.g. LB subnet(s) 422 of FIG. 4), a control plane app tier 624 (e.g. the control plane app tier 424 of FIG. 4) that can include app subnet(s) 626 (e.g. similar to app subnet(s) 426 of FIG. 4), a control plane data tier 628 (e.g. the control plane data tier 428 of FIG. 4) that can include DB subnet(s) 630. The LB subnet(s) 622 contained in the control plane DMZ tier 620 can be communicatively coupled to the app subnet(s) 626 contained in the control plane app tier 624 and to an Internet gateway 634 (e.g. the Internet gateway 434 of FIG. 4) that can be contained in the control plane VCN 616, and the app subnet(s) 626 can be communicatively coupled to the DB subnet(s) 630 contained in the control plane data tier 628 and to a service gateway 636 (e.g. the service gateway of FIG. 4) and a network address translation (NAT) gateway 638 (e.g. the NAT gateway 438 of FIG. 4). The control plane VCN 616 can include the service gateway 636 and the NAT gateway 638.

The data plane VCN 618 can include a data plane app tier 646 (e.g. the data plane app tier 446 of FIG. 4), a data plane DMZ tier 648 (e.g. the data plane DMZ tier 448 of FIG. 4), and a data plane data tier 650 (e.g. the data plane data tier 450 of FIG. 4). The data plane DMZ tier 648 can include LB subnet(s) 622 that can be communicatively coupled to trusted app subnet(s) 660 and untrusted app subnet(s) 662 of the data plane app tier 646 and the Internet gateway 634 contained in the data plane VCN 618. The trusted app subnet(s) 660 can be communicatively coupled to the service gateway 636 contained in the data plane VCN 618, the NAT gateway 638 contained in the data plane VCN 618, and DB subnet(s) 630 contained in the data plane data tier 650. The untrusted app subnet(s) 662 can be communicatively coupled to the service gateway 636 contained in the data plane VCN 618 and DB subnet(s) 630 contained in the data plane data tier 650. The data plane data tier 650 can include DB subnet(s) 630 that can be communicatively coupled to the service gateway 636 contained in the data plane VCN 618.

The untrusted app subnet(s) 662 can include one or more primary VNICs 664(1)-(N) that can be communicatively coupled to tenant virtual machines (VMs) 666(1)-(N). Each tenant VM 666(1)-(N) can be communicatively coupled to a respective app subnet 667(1)-(N) that can be contained in respective container egress VCNs 668(1)-(N) that can be contained in respective customer tenancies 670(1)-(N). Respective secondary VNICs 672(1)-(N) can facilitate communication between the untrusted app subnet(s) 662 contained in the data plane VCN 618 and the app subnet contained in the container egress VCNs 668(1)-(N). Each container egress VCNs 668(1)-(N) can include a NAT gateway 638 that can be communicatively coupled to public Internet 654 (e.g. public Internet 454 of FIG. 4).

The Internet gateway 634 contained in the control plane VCN 616 and contained in the data plane VCN 618 can be communicatively coupled to a metadata management service 652 (e.g. the metadata management system 452 of FIG. 4) that can be communicatively coupled to public Internet 654. Public Internet 654 can be communicatively coupled to the NAT gateway 638 contained in the control plane VCN 616 and contained in the data plane VCN 618. The service gateway 636 contained in the control plane VCN 616 and contained in the data plane VCN 618 can be communicatively couple to cloud services 656.

In some embodiments, the data plane VCN 618 can be integrated with customer tenancies 670. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 646. Code to run the function may be executed in the VMs 666(1)-(N), and the code may not be configured to run anywhere else on the data plane VCN 618. Each VM 666(1)-(N) may be connected to one customer tenancy 670. Respective containers 671(1)-(N) contained in the VMs 666(1)-(N) may be configured to run the code. In this case, there can be a dual isolation (e.g., the containers 671(1)-(N) running code, where the containers 671(1)-(N) may be contained in at least the VM 666(1)-(N) that are contained in the untrusted app subnet(s) 662), which may help prevent incorrect or otherwise undesirable code from damaging the network of the IaaS provider or from damaging a network of a different customer. The containers 671(1)-(N) may be communicatively coupled to the customer tenancy 670 and may be configured to transmit or receive data from the customer tenancy 670. The containers 671(1)-(N) may not be configured to transmit or receive data from any other entity in the data plane VCN 618. Upon completion of running the code, the IaaS provider may kill or otherwise dispose of the containers 671(1)-(N).

In some embodiments, the trusted app subnet(s) 660 may run code that may be owned or operated by the IaaS provider. In this embodiment, the trusted app subnet(s) 660 may be communicatively coupled to the DB subnet(s) 630 and be configured to execute CRUD operations in the DB subnet(s) 630. The untrusted app subnet(s) 662 may be communicatively coupled to the DB subnet(s) 630, but in this embodiment, the untrusted app subnet(s) may be configured to execute read operations in the DB subnet(s) 630. The containers 671(1)-(N) that can be contained in the VM 666(1)-(N) of each customer and that may run code from the customer may not be communicatively coupled with the DB subnet(s) 630.

In other embodiments, the control plane VCN 616 and the data plane VCN 618 may not be directly communicatively coupled. In this embodiment, there may be no direct communication between the control plane VCN 616 and the data plane VCN 618. However, communication can occur indirectly through at least one method. An LPG 610 may be established by the IaaS provider that can facilitate communication between the control plane VCN 616 and the data plane VCN 618. In another example, the control plane VCN 616 or the data plane VCN 618 can make a call to cloud services 656 via the service gateway 636. For example, a call to cloud services 656 from the control plane VCN 616 can include a request for a service that can communicate with the data plane VCN 618.

Figure 7:
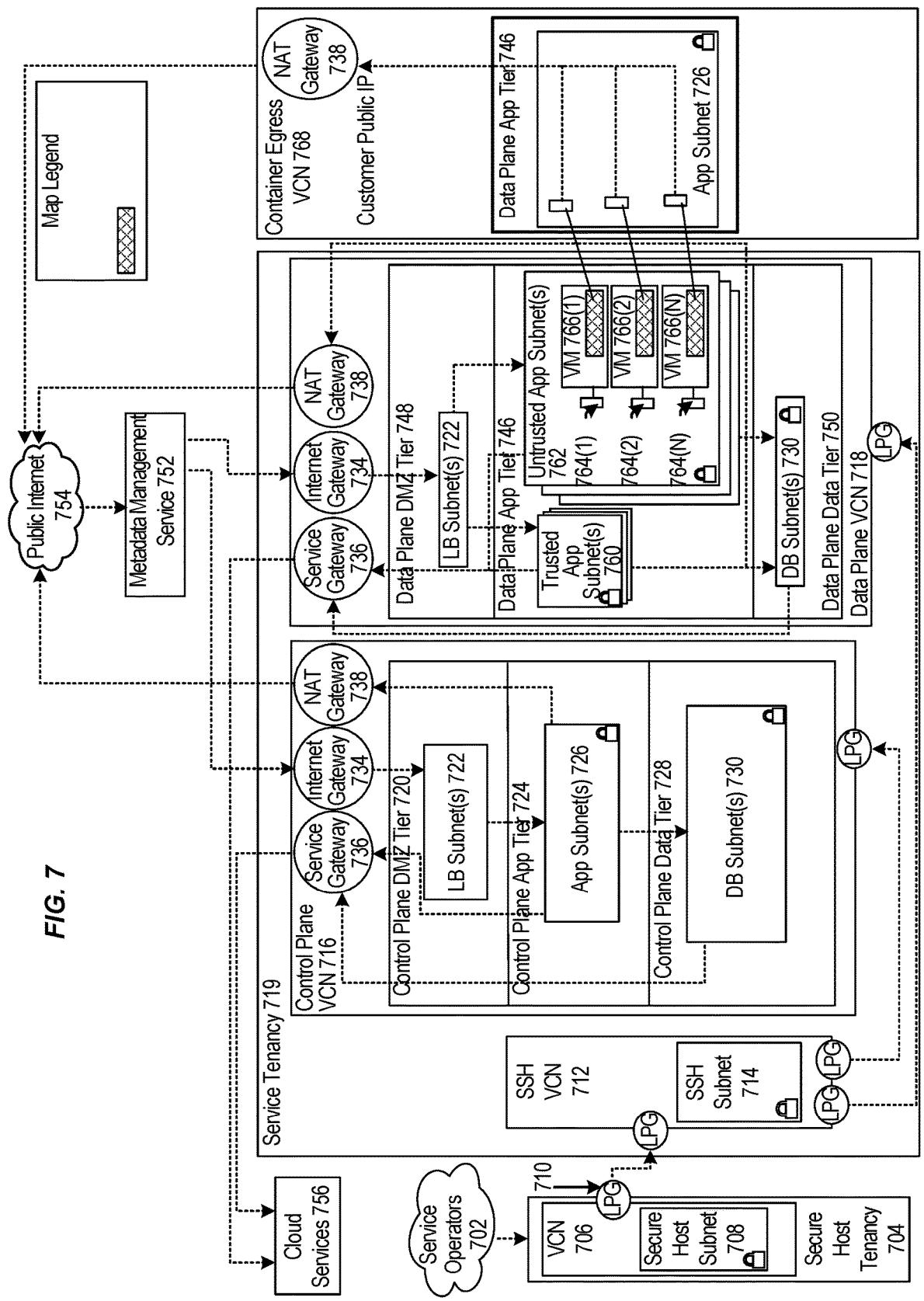
FIG. 7 is a block diagram illustrating another pattern for implementing a cloud infrastructure as a service system, according to at least one embodiment.

FIG. 7 is a block diagram 700 illustrating another example pattern of an IaaS architecture, according to at least one embodiment. Service operators 702 (e.g. service operators 402 of FIG. 4) can be communicatively coupled to a secure host tenancy 704 (e.g. the secure host tenancy 404 of FIG. 4) that can include a virtual cloud network (VCN) 706 (e.g. the VCN 406 of FIG. 4) and a secure host subnet 708 (e.g. the secure host subnet 408 of FIG. 4). The VCN 706 can include an LPG 710 (e.g. the LPG 410 of FIG. 4) that can be communicatively coupled to an SSH VCN 712 (e.g. the SSH VCN 412 of FIG. 4) via an LPG 710 contained in the SSH VCN 712. The SSH VCN 712 can include an SSH subnet 714 (e.g. the SSH subnet 414 of FIG. 4), and the SSH VCN 712 can be communicatively coupled to a control plane VCN 716 (e.g. the control plane VCN 416 of FIG. 4) via an LPG 710 contained in the control plane VCN 716 and to a data plane VCN 718 (e.g. the data plane 418 of FIG. 4) via an LPG 710 contained in the data plane VCN 718. The control plane VCN 716 and the data plane VCN 718 can be contained in a service tenancy 719 (e.g. the service tenancy 419 of FIG. 4).

The control plane VCN 716 can include a control plane DMZ tier 720 (e.g. the control plane DMZ tier 420 of FIG. 4) that can include LB subnet(s) 722 (e.g. LB subnet(s) 422 of FIG. 4), a control plane app tier 724 (e.g. the control plane app tier 424 of FIG. 4) that can include app subnet(s) 726 (e.g. app subnet(s) 426 of FIG. 4), a control plane data tier 728 (e.g. the control plane data tier 428 of FIG. 4) that can include DB subnet(s) 730 (e.g. DB subnet(s) 630 of FIG. 6). The LB subnet(s) 722 contained in the control plane DMZ tier 720 can be communicatively coupled to the app subnet(s) 726 contained in the control plane app tier 724 and to an Internet gateway 734 (e.g. the Internet gateway 434 of FIG. 4) that can be contained in the control plane VCN 716, and the app subnet(s) 726 can be communicatively coupled to the DB subnet(s) 730 contained in the control plane data tier 728 and to a service gateway 736 (e.g. the service gateway of FIG. 4) and a network address translation (NAT) gateway 738 (e.g. the NAT gateway 438 of FIG. 4). The control plane VCN 716 can include the service gateway 736 and the NAT gateway 738.

The data plane VCN 718 can include a data plane app tier 746 (e.g. the data plane app tier 446 of FIG. 4), a data plane DMZ tier 748 (e.g. the data plane DMZ tier 448 of FIG. 4), and a data plane data tier 750 (e.g. the data plane data tier 450 of FIG. 4). The data plane DMZ tier 748 can include LB subnet(s) 722 that can be communicatively coupled to trusted app subnet(s) 760 (e.g. trusted app subnet(s) 660 of FIG. 6) and untrusted app subnet(s) 762 (e.g. untrusted app subnet(s) 662 of FIG. 6) of the data plane app tier 746 and the Internet gateway 734 contained in the data plane VCN 718. The trusted app subnet(s) 760 can be communicatively coupled to the service gateway 736 contained in the data plane VCN 718, the NAT gateway 738 contained in the data plane VCN 718, and DB subnet(s) 730 contained in the data plane data tier 750. The untrusted app subnet(s) 762 can be communicatively coupled to the service gateway 736 contained in the data plane VCN 718 and DB subnet(s) 730 contained in the data plane data tier 750. The data plane data tier 750 can include DB subnet(s) 730 that can be communicatively coupled to the service gateway 736 contained in the data plane VCN 718.

The untrusted app subnet(s) 762 can include primary VNICs 764(1)-(N) that can be communicatively coupled to tenant virtual machines (VMs) 766(1)-(N) residing within the untrusted app subnet(s) 762. Each tenant VM 766(1)-(N) can run code in a respective container 767(1)-(N), and be communicatively coupled to an app subnet 726 that can be contained in a data plane app tier 746 that can be contained in a container egress VCN 768. Respective secondary VNICs 772(1)-(N) can facilitate communication between the untrusted app subnet(s) 762 contained in the data plane VCN 718 and the app subnet contained in the container egress VCN 768. The container egress VCN can include a NAT gateway 738 that can be communicatively coupled to public Internet 754 (e.g. public Internet 454 of FIG. 4).

The Internet gateway 734 contained in the control plane VCN 716 and contained in the data plane VCN 718 can be communicatively coupled to a metadata management service 752 (e.g. the metadata management system 452 of FIG. 4) that can be communicatively coupled to public Internet 754. Public Internet 754 can be communicatively coupled to the NAT gateway 738 contained in the control plane VCN 716 and contained in the data plane VCN 718. The service gateway 736 contained in the control plane VCN 716 and contained in the data plane VCN 718 can be communicatively couple to cloud services 756.

In some examples, the pattern illustrated by the architecture of block diagram 700 of FIG. 7 may be considered an exception to the pattern illustrated by the architecture of block diagram 600 of FIG. 6 and may be desirable for a customer of the IaaS provider if the IaaS provider cannot directly communicate with the customer (e.g., a disconnected region). The respective containers 767(1)-(N) that are contained in the VMs 766(1)-(N) for each customer can be accessed in real-time by the customer. The containers 767(1)-(N) may be configured to make calls to respective secondary VNICs 772(1)-(N) contained in app subnet(s) 726 of the data plane app tier 746 that can be contained in the container egress VCN 768. The secondary VNICs 772(1)-(N) can transmit the calls to the NAT gateway 738 that may transmit the calls to public Internet 754. In this example, the containers 767(1)-(N) that can be accessed in real-time by the customer can be isolated from the control plane VCN 716 and can be isolated from other entities contained in the data plane VCN 718. The containers 767(1)-(N) may also be isolated from resources from other customers.

In other examples, the customer can use the containers 767(1)-(N) to call cloud services 756. In this example, the customer may run code in the containers 767(1)-(N) that requests a service from cloud services 756. The containers 767(1)-(N) can transmit this request to the secondary VNICs 772(1)-(N) that can transmit the request to the NAT gateway that can transmit the request to public Internet 754. Public Internet 754 can transmit the request to LB subnet(s) 722 contained in the control plane VCN 716 via the Internet gateway 734. In response to determining the request is valid, the LB subnet(s) can transmit the request to app subnet(s) 726 that can transmit the request to cloud services 756 via the service gateway 736.

It should be appreciated that IaaS architectures 400, 500, 600, 700 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 8:
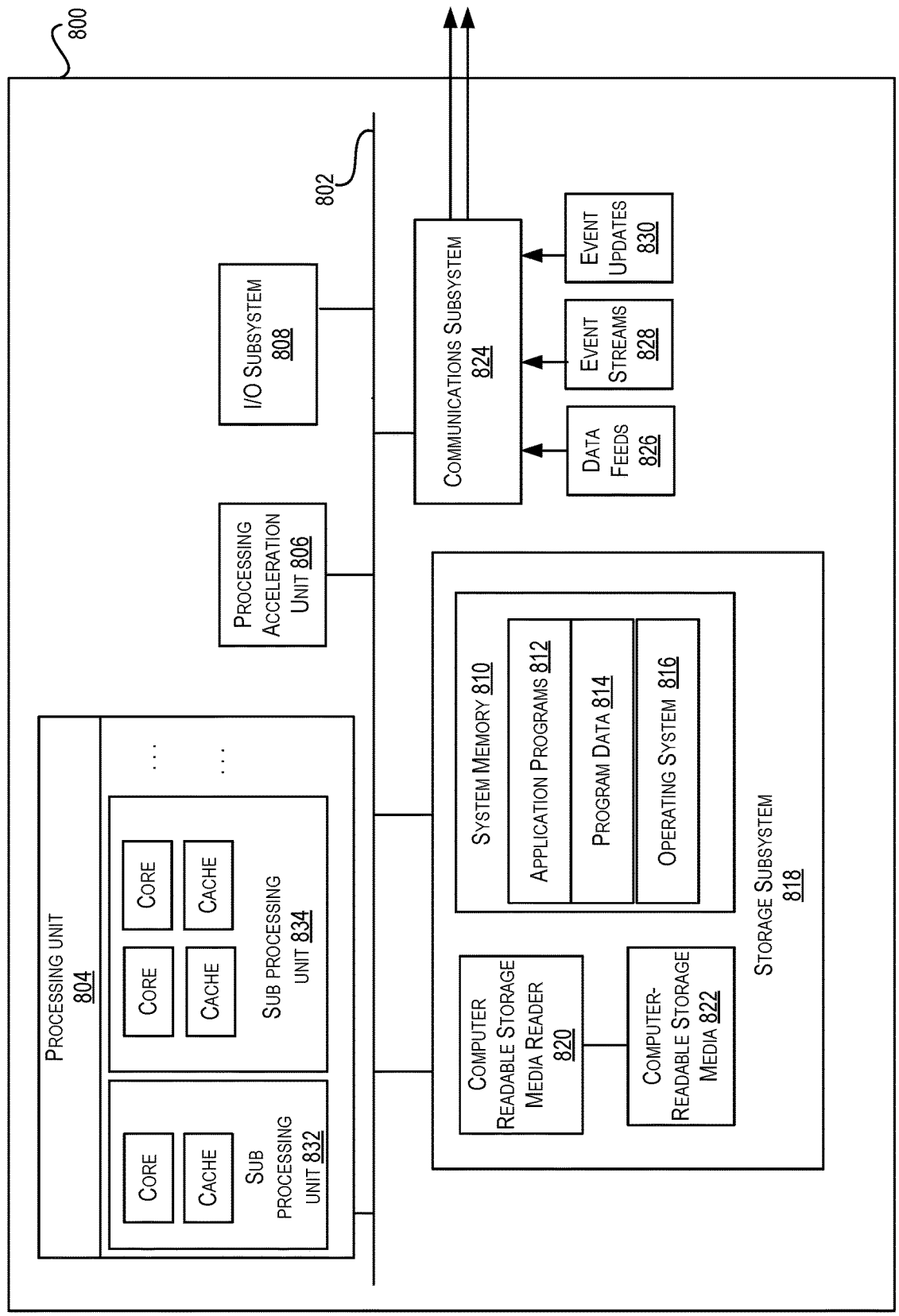
FIG. 8 is a block diagram illustrating an example computer system, according to at least one embodiment.

FIG. 8 illustrates an example computer system 800, in which various embodiments may be implemented. The system 800 may be used to implement any of the computer systems described above. As shown in the figure, computer system 800 includes a processing unit 804 that communicates with a number of peripheral subsystems via a bus subsystem 802. These peripheral subsystems may include a processing acceleration unit 806, an I/O subsystem 808, a storage subsystem 818 and a communications subsystem 824. Storage subsystem 818 includes tangible computer-readable storage media 822 and a system memory 810.

Bus subsystem 802 provides a mechanism for letting the various components and subsystems of computer system 800 communicate with each other as intended. Although bus subsystem 802 is shown schematically as a single bus, alternative embodiments of the bus subsystem may utilize multiple buses. Bus subsystem 802 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 804, which can be implemented as one or more integrated circuits (e.g., a conventional microprocessor or microcontroller), controls the operation of computer system 800. One or more processors may be included in processing unit 804. These processors may include single core or multicore processors. In certain embodiments, processing unit 804 may be implemented as one or more independent processing units 832 and/or 834 with single or multicore processors included in each processing unit. In other embodiments, processing unit 804 may also be implemented as a quad-core processing unit formed by integrating two dual-core processors into a single chip.

In various embodiments, processing unit 804 can execute a variety of programs in response to program code and can maintain multiple concurrently executing programs or processes. At any given time, some or all of the program code to be executed can be resident in processor(s) 804 and/or in storage subsystem 818. Through suitable programming, processor(s) 804 can provide various functionalities described above. Computer system 800 may additionally include a processing acceleration unit 806, which can include a digital signal processor (DSP), a special-purpose processor, and/or the like.

I/O subsystem 808 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 800 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 800 may comprise a storage subsystem 818 that comprises software elements, shown as being currently located within a system memory 810. System memory 810 may store program instructions that are loadable and executable on processing unit 804, as well as data generated during the execution of these programs.

Depending on the configuration and type of computer system 800, system memory 810 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 804. In some implementations, system memory 810 may include multiple different types of memory, such as static random access memory (SRAM) or dynamic random access memory (DRAM). In some implementations, a basic input/output system (BIOS), containing the basic routines that help to transfer information between elements within computer system 800, such as during start-up, may typically be stored in the ROM. By way of example, and not limitation, system memory 810 also illustrates application programs 812, which may include client applications, Web browsers, mid-tier applications, relational database management systems (RDBMS), etc., program data 814, and an operating system 816. By way of example, operating system 816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 15 OS, and Palm® OS operating systems.

Storage subsystem 818 may also provide a tangible computer-readable storage medium for storing the basic programming and data constructs that provide the functionality of some embodiments. Software (programs, code modules, instructions) that when executed by a processor provide the functionality described above may be stored in storage subsystem 818. These software modules or instructions may be executed by processing unit 804. Storage subsystem 818 may also provide a repository for storing data used in accordance with the present disclosure.

Storage subsystem 800 may also include a computer-readable storage media reader 820 that can further be connected to computer-readable storage media 822. Together and, optionally, in combination with system memory 810, computer-readable storage media 822 may comprehensively represent remote, local, fixed, and/or removable storage devices plus storage media for temporarily and/or more permanently containing, storing, transmitting, and retrieving computer-readable information.

Computer-readable storage media 822 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 800.

By way of example, computer-readable storage media 822 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 800.

Communications subsystem 824 provides an interface to other computer systems and networks. Communications subsystem 824 serves as an interface for receiving data from and transmitting data to other systems from computer system 800. For example, communications subsystem 824 may enable computer system 800 to connect to one or more devices via the Internet. In some embodiments communications subsystem 824 can include radio frequency (RF) transceiver components for accessing wireless voice and/or data networks (e.g., using cellular telephone technology, advanced data network technology, such as 3G, 4G or EDGE (enhanced data rates for global evolution), Wi-Fi™ (IEEE 802.11 family standards, or other mobile communication technologies, or any combination thereof), global positioning system (GPS) receiver components, and/or other components. In some embodiments communications subsystem 824 can provide wired network connectivity (e.g., Ethernet) in addition to or instead of a wireless interface.

In some embodiments, communications subsystem 824 may also receive input communication in the form of structured and/or unstructured data feeds 826, event streams 828, event updates 830, and the like on behalf of one or more users who may use computer system 800.

By way of example, communications subsystem 824 may be configured to receive data feeds 826 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 824 may also be configured to receive data in the form of continuous data streams, which may include event streams 828 of real-time events and/or event updates 830, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 824 may also be configured to output the structured and/or unstructured data feeds 826, event streams 828, event updates 830, and the like to one or more databases that may be in communication with one or more streaming data source computers coupled to computer system 800.

Computer system 800 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 800 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

The invention claimed is:

1. A method performed by one or more processors by executing a set of computer-readable instructions, the method comprising:
   determining, based upon metadata associated with a container image to be processed for vulnerabilities, the container image including a hierarchy of a plurality of layers;
   calculating a vulnerability score for each layer in the plurality of layers based upon scan results generated from scanning a plurality of container images for vulnerabilities at a given time;
   computing a vulnerability score for the container image based upon the vulnerability scores calculated for the plurality of layers by accessing the vulnerability scores calculated for each of the plurality of layers included in the container image, and based on a weight assigned to a position of the layer in the hierarchy of the plurality of layers;

generating a vulnerability report for the container image, the vulnerability report including the vulnerability score for the container image; and determining whether to scan the container image based on the vulnerability report.

2. The method of claim 1, wherein the plurality of container images does not include the container image for which the vulnerability score is computed.

3. The method of claim 1, wherein calculating the vulnerability score for each layer in the plurality of layers comprises:

for a first layer in the plurality of layers, calculating a vulnerability score for the first layer based upon (a) a number of container images in the plurality of container images that include the first layer, and (b) a number of container images in the plurality of container images including the first layer that were found to contain a vulnerability.

4. The method of claim 1, wherein calculating the vulnerability score for each layer in the plurality of layers comprises:

for a first layer in the plurality of layers, calculating the vulnerability score for the first layer as a ratio of (a) a number of container images in the plurality of container images that include the first layer, and (b) a number of container images in the plurality of container images including the first layer that were found to contain a vulnerability.

5. The method of claim 1, wherein the plurality of container images includes the container image for which the vulnerability score is computed.

6. The method of claim 1, further comprising:

determining, based upon the vulnerability score computed for the container image, whether an action is to be performed for the container image.

7. The method of claim 6, wherein determining whether the action is to be performed comprises:

identifying a preconfigured rule; and determining whether the action is to be performed based upon the vulnerability score computed for the container image and the identified rule.

8. The method of claim 6, wherein determining whether the action is to be performed comprises:

determining that the action is to be performed if the vulnerability score computed for the container image is greater than a threshold value.

9. The method of claim 6, wherein the action comprises performing a vulnerability scan on the container image.

10. The method of claim 6, wherein the action comprises generating an ordered list of a set of container images and associated vulnerability scores, the set of container images including the container image for which the vulnerability score is computed, wherein the set of container images are ordered in the ordered list based upon their associated vulnerability scores and the container images in the ordered list are scheduled for a vulnerability scan based upon their order in the ordered list starting from a highest ranked container image in the ordered list.

11. The method of claim 1, further comprising identifying a hierarchy between the layers in the plurality of layers in the container image, wherein computing the vulnerability score for the container image comprises:

generating the vulnerability score for the container image based upon the vulnerability scores calculated for plurality of layers, and for each layer, a weight assigned to the layer based upon a memory size of the layer.

12. The method of claim 1, further comprising identifying the hierarchy between the layers in the plurality of layers in the container image, wherein computing the vulnerability score for the container image comprises:

generating the vulnerability score for the container image based upon the vulnerability scores calculated for the plurality of layers in the hierarchy, and for each layer, the weight assigned to the layer based upon a most recent scan time of the layer.

13. The method of claim 1, further comprising identifying a hierarchy between the layers in the plurality of layers in the container image, wherein computing the vulnerability score for the container image comprises determining an arithmetic mean of the vulnerability scores calculated for the plurality of layers.

14. The method of claim 1 wherein computing the vulnerability score for the container image comprises:

identifying, from a plurality of computation techniques, a first computation technique to be used for computing the vulnerability score for the container image; and generating the vulnerability score for the container image by using the identified first computation technique.

15. The method of claim 1, wherein computing the vulnerability score for the container image based upon the vulnerability scores calculated for the plurality of layers comprises:

generating a first vulnerability score for the container image based upon the vulnerability scores calculated for the plurality of layers;

determining a time period since a previous vulnerability scan of the container image;

generating a second vulnerability score for the container image based upon the first vulnerability score and the time period since the previous vulnerability scan of the container image, wherein the second vulnerability score is different from the first vulnerability score; and outputting the second vulnerability score as the vulnerability score for the container image.

16. A system, comprising:

one or more processors; and a non-transitory computer-readable storage medium comprising computer-executable instructions that, when executed by the processor, cause the system to perform processing comprising:

determining, based upon metadata associated with a container image to be processed for vulnerabilities, the container image including a hierarchy of a plurality of layers;

calculating a vulnerability score for each layer in the plurality of layers based upon scan results generated from scanning a plurality of container images for vulnerabilities at a given time;

computing a vulnerability score for the container image based upon the vulnerability scores calculated for the plurality of layers by accessing the vulnerability scores calculated for each of the plurality of layers included in the container image, and based on a weight assigned to a position of the layer in the hierarchy of the plurality of layers;

generating a vulnerability report for the container image, the vulnerability report including the vulnerability score for the container image; and determining whether to scan the container image based on the vulnerability report.

17. The system of claim 16, wherein calculating the vulnerability score for each layer in the plurality of layers comprises:

for a first layer in the plurality of layers, calculating the vulnerability score for the first layer based upon (a) a number of container images in the plurality of container images that include the first layer, and (b) a number of container images in the plurality of container images including the first layer that were found to contain a vulnerability.

18. A non-transitory computer-readable storage medium comprising computer-executable instructions that when executed by a processor, cause the processor to perform processing comprising:

determining, based upon metadata associated with a container image to be processed for vulnerabilities, the container image including a hierarchy of a plurality of layers;

calculating a vulnerability score for each layer in the plurality of layers based upon scan results generated from scanning a plurality of container images for vulnerabilities at a given time;

computing a vulnerability score for the container image based upon the vulnerability scores calculated for the plurality of layers by accessing the vulnerability scores calculated for each of the plurality of layers included in the container image, and based on a weight assigned to a position of the layer in the hierarchy of the plurality of layers;

generating a vulnerability report for the container image, the vulnerability report including the vulnerability score for the container image; and determining whether to scan the container image based on the vulnerability report.

19. The method according to claim 1, wherein a higher weight is given to a higher layer, and a lower weight is given to a lower layer.

20. The method according to claim 1, wherein a higher weight is given to a layer with a larger memory size, and a lower weight is given to a layer with a lower memory size.

* * * * *